US012671461B2

(12) United States Patent
Huang et al.

(10) Patent No.: US 12,671,461 B2
(45) Date of Patent: Jun. 30, 2026

(54) SIGNAL TRANSMISSION METHOD AND APPARATUS

(71) Applicant: HUAWEI TECHNOLOGIES CO., LTD., Shenzhen (CN)

(72) Inventors: Huang Huang, Shenzhen (CN); Qianli Ma, Chengdu (CN)

(73) Assignee: Huawei Technologies Co., LTD., Shenzhen (CN)

( * ) Notice: Subject to any disclaimer, the term of this patent is extended or adjusted under 35 U.S.C. 154(b) by 2 days.

(21) Appl. No.: 18/903,236

(22) Filed: Oct. 1, 2024

(65) Prior Publication Data

US 2025/0023600 A1 Jan. 16, 2025

Related U.S. Application Data

(63) Continuation of application No. PCT/CN2023/084184, filed on Mar. 27, 2023.

(30) Foreign Application Priority Data

Apr. 2, 2022 (CN) .......................... 202210351131.9

(51) Int. Cl.
*H04B 1/69* (2011.01)
(52) U.S. Cl.
CPC ....... *H04B 1/69* (2013.01); *H04B 2001/6912* (2013.01)
(58) Field of Classification Search
CPC .. H04B 1/69; H04B 2001/6912; H04L 27/103
See application file for complete search history.

(56) References Cited

U.S. PATENT DOCUMENTS 11,728,905 B2 * 8/2023 Kelin ................... H04B 1/7176
367/137
2021/0239787 A1 * 8/2021 Li .......................... G01S 13/343

FOREIGN PATENT DOCUMENTS

CN 102223223 A 10/2011

OTHER PUBLICATIONS

3GPP TS 38.211 V17.1.0, "3rd Generation Partnership Project; Technical Specification Group Radio Access Network; NR; Physical channels and modulation (Release 17)," Mar. 2022, 130 pages.
3GPP TS 36.211 V17.1.0, "3rd Generation Partnership Project; Technical Specification Group Radio Access Network; Evolved Universal Terrestrial Radio Access (E-UTRA); Physical channels and modulation (Release 17)," Mar. 2022, 249 pages.
International Search Report and Written Opinion in International Appln. No. PCT/CN2023/084184, mailed on Apr. 24, 2023, 16 pages (with English translation).

(Continued)

*Primary Examiner* — Vineeta S Panwalkar
(74) *Attorney, Agent, or Firm* — Fish & Richardson P.C.

(57) ABSTRACT

Example signal transmission methods and apparatus are described. In an example method, a transmit end performs linear frequency modulation on Z data signals within frequency domain resources corresponding to K subcarriers to obtain a first signal. A frequency occupied by the first signal is within a frequency range of the frequency domain resources corresponding to the K subcarriers. A frequency occupied by each of data signals obtained through linear frequency modulation changes linearly with time.

20 Claims, 7 Drawing Sheets

(56)                    References Cited

OTHER PUBLICATIONS

Ouyang et al., "Orthogonal Chirp Division Multiplexing," IEEE Transactions on Communications, Sep. 2016, 64(9):12 pages.
Bemani et al., "AFDM: A Full Diversity Next Generation Waveform foe High Mobility Communications," Paper, Presented at Proceedings of the 2021 IEEE International Conference on Communications Workshops (ICC Workshops), Jun. 14-23, 2021, 6 pages.
Ouyang et al., "Chirp Spread Spectrum Toward the Nyquist Signaling Rate-Orthogonality Condition and Applications," IEEE Signal Processing Letters, Oct. 2017, 24(10):5 pages.
Wang et al., "Towards Integrated Sensing and Communications for 6G," Paper, Presented at Proceedings of the 2022 2nd IEEE International Symposium on Joint Communications and Sensing (JC&S), Mar. 9-10, 2022, 6 pages.
Extended European Search Report in European Appln. No. 23778136.4, mailed on Jun. 5, 2025, 14 pages.

* cited by examiner a b

SIGNAL TRANSMISSION METHOD AND APPARATUS

CROSS-REFERENCE TO RELATED APPLICATIONS

This application is a continuation of International Application No. PCT/CN2023/084184, filed on Mar. 27, 2023, which claims priority to Chinese Patent Application No. 202210351131.9, filed on Apr. 2, 2022. The disclosures of the aforementioned applications are hereby incorporated by reference in their entireties.

TECHNICAL FIELD

This application relates to the field of wireless communication technologies, and in particular, to a signal transmission method and an apparatus.

BACKGROUND

Integrated sensing and communication (ISAC) is an application scenario of next generation wireless communication. A linear frequency modulated signal of a linear frequency modulated continuous wave (FMCW), for example, a chirp (chirp) signal, is used as a waveform for ISAC, to implement both communication and sensing functions.

Currently, the chirp signal may be obtained by performing phase shifting on a data signal, performing general inverse discrete Fourier transform (GIDFT) on a data signal obtained through phase shifting, and then performing time-domain phase shifting.

However, time-domain phase shifting causes spectrum expansion. To be specific, time-domain phase shifting makes a bandwidth occupied by the chirp signal larger than that occupied by an orthogonal frequency division multiplexing (OFDM) signal, resulting in a waste of transmission resources.

SUMMARY

This application provides a signal transmission method and an apparatus, to resolve a problem of spectrum expansion caused by time-domain phase shifting, and save transmission resources.

According to a first aspect, a signal transmission method is provided. The method may be performed by a device at a transmit end, or may be performed by a chip having a function similar to that of the device at the transmit end. It may be understood that the device at the transmit end may be a network device or a terminal device. In the method, the transmit end performs linear frequency modulation on Z data signals within frequency domain resources corresponding to K subcarriers, to obtain a first signal. A frequency occupied by the first signal is within a frequency range of the frequency domain resources corresponding to the K subcarriers. A frequency occupied by each of data signals obtained through linear frequency modulation changes linearly with time. A $z^{th}$ data signal in the Z data signals corresponds to $M_Z$ time segments, and slopes of linear changes of all of the $M_Z$ time segments are the same. When $M_Z>1$, a start frequency of an $M_Z^{th}$ segment is a lowest frequency in the frequency range, and an end frequency of an $(M_Z-1)^{th}$ segment is a highest frequency in the frequency range; or a start frequency of an $M_Z^{th}$ segment is a highest frequency in the frequency range, and an end frequency of an $(M_Z-1)^{th}$ segment is a lowest frequency in the frequency range. K, $M_Z$, and Z are integers greater than or equal to 1, and z ranges from 1 to Z. Optionally, Z is less than or equal to K. Optionally, $M_Z$ and Z are integers greater than or equal to 2.

Based on the foregoing solution, the frequency occupied by the first signal generated by performing linear frequency modulation on the data signals by the transmit end is within the frequency range of the frequency domain resources corresponding to the K subcarriers. Compared with spectrum expansion caused by linear frequency modulation, the first signal does not need to occupy a frequency of more than K subcarriers. Therefore, a waste of transmission resources can be reduced.

In an example, in the $M_Z$ time segments, a start frequency of a first time segment is higher than a start frequency of a second time segment; or a start frequency of a first time segment is lower than a start frequency of a second time segment. In another example, for a signal generated based on a same data signal, if a frequency occupied by the signal is folded, a frequency-folded part of the signal corresponds to a first time segment, and a frequency-unfolded part of the signal corresponds to a second time segment.

In a possible implementation, the first signal is an analog signal, the frequency of the first signal is within a first range, and the first range is $$\left[\left(k_0 - \frac{1}{2}\right)\Delta f, \left(k_0 - \frac{1}{2} + K\right)\Delta f\right].$$

$k_0$ is a subcarrier index corresponding to a subcarrier with a lowest frequency in the K subcarriers, $k_0$ is an integer, and $\Delta f$ is a subcarrier width.

In a possible implementation, the frequency of the first signal is within a first range, and the first range is $$\left[\left(k_0 - \frac{1}{2} + K\right)\Delta f, \left(k_0 - \frac{1}{2}\right)\Delta f\right].$$

$k_0$ is a subcarrier index corresponding to a subcarrier with a lowest frequency in the K su carriers, $k_0$ is an integer, and $\Delta f$ is a subcarrier width.

Based on the foregoing solution, the transmit end may limit the frequency of the first signal within the first range, to be specific, within the frequency range of the frequency domain resources corresponding to the K subcarriers, to avoid a resource waste caused by spectrum expansion.

In a possible implementation, the first signal is a digital signal, the frequency of the first signal is within a second range, and the second range is $[k_0, k_0+K-1]$. $k_0$ is a subcarrier index corresponding to a subcarrier with a lowest frequency in the K subcarriers, and $k_0$ is an integer.

In a possible implementation, the first signal is a digital signal, the frequency of the first signal is within a second range, and the second range is $[k_0+K-1, k_0]$. $k_0$ is a subcarrier index corresponding to a subcarrier with a lowest frequency in the K subcarriers, and $k_0$ is an integer.

Based on the foregoing solution, the transmit end may convert the first signal into a digital signal, and may limit a frequency of the digital signal within the foregoing second range, to be specific, within the frequency range of the frequency domain resources corresponding to the K subcarriers, to avoid a resource waste caused by spectrum expansion.

In a possible implementation, the transmit end may perform phase shifting on the data signal, and perform GIDFT on a data signal obtained through phase shifting. The transmit end may perform time-domain phase shifting on a data signal obtained through GIDFT. The transmit end may increase, by a frequency adjustment amount, a frequency occupied by a data signal obtained through time-domain phase shifting. The frequency adjustment amount may be an integer multiple of a subcarrier width.

Based on the foregoing solution, the transmit end may generate, through time-domain phase shifting, a signal whose occupied frequency is outside of the frequency range corresponding to the K subcarriers. The transmit end may increase, by the frequency adjustment amount, a frequency occupied by the signal, to fold, back into the frequency range corresponding to the K subcarriers, a frequency that is of a part of the signal and that is outside of the frequency range corresponding to the K subcarriers. Therefore, transmission resources can be saved.

In a possible implementation, the first signal includes a cyclic prefix signal and a non-cyclic prefix signal. The cyclic prefix signal is a signal generated based on the Z data signals and cyclic prefix time, and the non-cyclic prefix signal is a signal generated based on the Z data signals and non-cyclic prefix time.

Based on the foregoing solution, the transmit end may generate the first signal including the cyclic prefix signal, so that interference between signals can be eliminated, thereby improving transmission performance of the first signal.

In a possible implementation, the transmit end performs phase shifting on the data signals, and performs K-point GIDFT on data signals obtained through phase shifting, to generate a second signal. The transmit end performs phase shifting on the second signal based on non-cyclic prefix time $\{n_1, \ldots, n_1+K-1\}$, to generate a third signal, and transforms the third signal to a frequency domain by performing K-point GDFT and maps the third signal onto the K subcarriers, to obtain a fourth signal. The transmit end transforms the fourth signal back to a time domain by performing N-point GIDFT, to obtain a non-cyclic prefix signal with N points. The transmit end performs phase shifting on the second signal based on cyclic prefix time $\{n_2, \ldots, n_2+K-1\}$, to generate a fifth signal, and transforms the fifth signal to the frequency domain by performing K-point GDFT and maps the fifth signal onto the K subcarriers, to obtain a sixth signal. The transmit end transforms the sixth signal back to the time domain by performing N-point GIDFT, to obtain a cyclic prefix signal with L points. Time corresponding to the L points is $\{\tilde{n}_2, \ldots, \tilde{n}_2+L-1\}$, L is a length of a cyclic prefix, N is a length of a non-cyclic prefix, and L and N are integers greater than or equal to 0.

Based on the foregoing solution, the transmit end may separately generate the cyclic prefix signal and the non-cyclic prefix signal, and map the cyclic prefix signal and the non-cyclic prefix signal onto the K subcarriers, to be specific, make both frequencies occupied by the cyclic prefix signal and the non-cyclic prefix signal be within the frequency range corresponding to the K subcarriers, so that a resource waste caused by spectrum expansion can be avoided.

In a possible implementation, the cyclic prefix signal and the non-cyclic prefix signal are continuous in time. Based on the foregoing solution, interference between non-cyclic prefix signals may be reduced by using the cyclic prefix signal.

In a possible implementation, $\tilde{n}_2$ satisfies the following formula:

$$\frac{(n_1 - n_2)N}{K} - L.$$

Based on the foregoing solution, when start time of the cyclic prefix signal satisfies the foregoing formula, the cyclic prefix signal and the non-cyclic prefix signal are continuous in time.

In a possible implementation, $n_1=0$, $n_2=-K$, and $\tilde{n}_2=N-L$; $n_1=K$, $n_2=0$, and $\tilde{n}_2=N-L$; $n_1=0$, $n_2=-K/2$, and $\tilde{n}_2=N/2-L$, where optionally, N and K are even numbers; or $n_1=K$, $n_2=K/2$, and $\tilde{n}_2=N/2-L$, where optionally, N and K are even numbers.

Based on the foregoing solution, the start time of the cyclic prefix signal in the foregoing four cases may be an integer. This is beneficial to mapping the generated cyclic prefix signal and the generated non-cyclic prefix signal onto a time domain resource.

According to a second aspect, a signal transmission method is provided. The method may be performed by a device at a receive end, or may be performed by a chip having a function similar to that of the device at the receive end. It may be understood that the device at the receive end may be a network device or a terminal device. In the method, the receive end obtains a first signal on K subcarriers. A frequency occupied by the first signal is within a frequency range of frequency domain resources corresponding to the K subcarriers. K is an integer greater than or equal to 1. The receive end demodulates the first signal by using the frequency range of the frequency resources corresponding to the K subcarriers as a sampling rate, to obtain a data signal.

In a possible implementation, the first signal is an analog signal, the frequency of the first signal is within a first range, and the first range is $$\left[\left(k_0 - \frac{1}{2}\right)\Delta f, \left(k_0 - \frac{1}{2} + K\right)\Delta f\right].$$

$k_0$ is a subcarrier index corresponding to a subcarrier with a lowest frequency in the K subcarriers, and $\Delta f$ is a subcarrier width. Optionally, the first signal is an analog signal.

In a possible implementation, the first signal is an analog signal, the frequency of the first signal is within a first range, and the first range is $$\left[\left(k_0 - \frac{1}{2} + K\right)\Delta f, \left(k_0 - \frac{1}{2}\right)\Delta f\right].$$

$k_0$ is a subcarrier index corresponding to a subcarrier with a lowest frequency in the K subcarriers, $k_0$ is an integer, and $\Delta f$ is a subcarrier width. Optionally, the first signal is an analog signal.

In a possible implementation, the first signal is a digital signal, the frequency of the first signal is within a second range, and the second range is $[k_0, k_0+K-1]$. $k_0$ is a subcarrier index corresponding to a subcarrier with a lowest frequency in the K subcarriers. Optionally, the first signal is a digital signal.

In a possible implementation, the first signal is a digital signal, the frequency of the first signal is within a second range, and the second range is $[k_0+K-1, k_0]$. $k_0$ is a subcarrier index corresponding to a subcarrier with a lowest frequency in the K subcarriers, and $k_0$ is an integer. Optionally, the first signal is a digital signal.

In a possible implementation, the receive end samples the first signal by using the frequency range of the frequency resources corresponding to the K subcarriers as a sampling rate, and the receive end performs GDFT on the sampled first signal. The receive end performs phase shifting on a first signal obtained through general discrete Fourier transform, to obtain a data signal.

In a possible implementation, the first signal includes a cyclic prefix signal and a non-cyclic prefix signal. The cyclic prefix signal is a signal generated based on Z data signals and cyclic prefix time, and the non-cyclic prefix signal is a signal generated based on a known data signal in the Z data signals and non-cyclic prefix time.

In a possible implementation, the cyclic prefix signal and the non-cyclic prefix signal are continuous in time.

According to a third aspect, an embodiment of this application provides a communication apparatus. The apparatus may be a device at a transmit end, or may be a chip or a module used in the device at the transmit end. The apparatus has a function of implementing any implementation of the first aspect. The function may be implemented by hardware, or may be implemented by hardware executing corresponding software. The hardware or the software includes one or more modules or units corresponding to the foregoing function.

According to a fourth aspect, an embodiment of this application provides a communication apparatus. The apparatus may be a device at a receive end, or may be a chip or a module used in the device at the receive end. The apparatus has a function of implementing any implementation of the second aspect. The function may be implemented by hardware, or may be implemented by hardware executing corresponding software. The hardware or the software includes one or more modules or units corresponding to the foregoing function.

According to a fifth aspect, this application provides a communication apparatus, including a processor. The processor is coupled to a memory. The memory is configured to store a computer program or instructions. The processor is configured to execute the computer program or the instructions, to perform the methods in the first aspect and the second aspect. The memory may be located inside the apparatus, or may be located outside the apparatus. There are one or more processors.

According to a sixth aspect, this application provides a communication apparatus, including: a processor and an interface circuit. The interface circuit is configured to communicate with another apparatus. The processor is configured to perform the methods in the first aspect and the second aspect.

According to a seventh aspect, a communication apparatus is provided. The apparatus includes a logic circuit and an input/output interface.

In a design, the logic circuit is configured to perform linear frequency modulation on Z data signals within frequency domain resources corresponding to K subcarriers, to obtain a first signal. The input/output interface is configured to output the first signal. A frequency occupied by the first signal is within a frequency range of the frequency domain resources corresponding to the K subcarriers, and a frequency occupied by each of Z data signals obtained through linear frequency modulation changes linearly with time. A $z^{th}$ data signal in the Z data signals corresponds to $M_z$ time segments, and slopes of linear changes of all of the $M_z$ time segments are the same. When $M_z > 1$, a start frequency of an $M_z^{th}$ segment is a lowest frequency in the frequency range, and an end frequency of an $(M_z - 1)^{th}$ segment is a highest frequency in the frequency range; or a start frequency of an $M_z^{th}$ segment is a highest frequency in the frequency range, and an end frequency of an $(M_z - 1)^{th}$ segment is a lowest frequency in the frequency range. K, M, and Z are integers greater than or equal to 1, and z ranges from 1 to Z.

In a design, the input/output interface is configured to input the first signal on the K subcarriers. The frequency occupied by the first signal is within the frequency range of the frequency domain resources corresponding to the K subcarriers, and K is an integer greater than or equal to 1. The logic circuit is configured to demodulate the first signal by using the frequency range of the frequency resources corresponding to the K subcarriers as a sampling rate, to obtain a data signal.

According to an eighth aspect, this application provides a communication system, including: a communication apparatus configured to perform the method in the first aspect and a communication apparatus configured to perform the method in the second aspect.

According to a ninth aspect, this application further provides a chip system, including a processor configured to perform the methods in the first aspect and the second aspect.

According to a tenth aspect, this application further provides a computer program product, including computer-executable instructions. When the computer-executable instructions are run on a computer, the methods in the first aspect and the second aspect are enabled to be performed.

According to an eleventh aspect, this application further provides a computer-readable storage medium. The computer-readable storage medium stores a computer program or instructions. When the instructions are run on a computer, the methods in the first aspect and the second aspect are implemented.

For technical effects achieved in the second aspect to the eleventh aspect, refer to the technical effects in the first aspect. Details are not described herein again.

7

Figure 12:
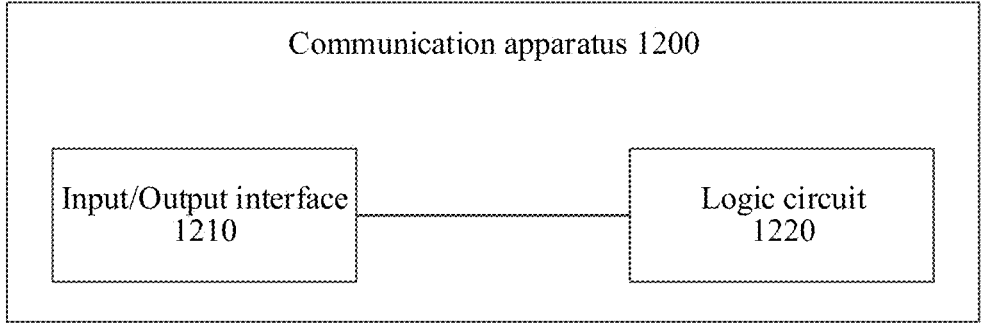

FIG. 12 is a block diagram of a communication apparatus according to an embodiment of this application.

DESCRIPTION OF EMBODIMENTS

For ease of understanding of the technical solutions provided in embodiments of this application, the following explains and describes technical terms used in embodiments of this application.

(1) Linear frequency modulation indicates that frequency modulation is performed on a data signal, and a frequency occupied by a data signal obtained through linear frequency modulation changes linearly with time. For example, the frequency occupied by the data signal obtained through linear frequency modulation increases with time, or the frequency occupied by the data signal obtained through linear frequency modulation decreases with time.

(2) Discrete Fourier transform (DFT)/Fast Fourier transform (FFT): For a sequence $\{x(n), n=0, \ldots, N-1\}$ of N points, discrete Fourier transform is as follows:

$$X(k) = \gamma \sum_{n=0}^{N-1} x(n) e^{-j2\pi \frac{nk}{N}}, k = 0, \ldots, N-1$$

The essence of discrete Fourier transform is to transform the time domain sequence $\{x(n)\}$ to the frequency domain sequence $\{X(k)\}$. FFT is a fast calculation method for DFT. $\gamma$ is a constant. Generally, $$\gamma = 1, \gamma = \frac{1}{\sqrt{N}}, \text{ or } \gamma = \frac{1}{N}$$

(3) Inverse discrete Fourier transform (inverse discrete Fourier transform, IDFT)/Inverse fast Fourier transform (inverse fast Fourier transform, IFFT): For a sequence $\{X(k), k=0, \ldots, N-1\}$ of N points, inverse discrete Fourier transform is as follows:

$$x(n) = \beta \sum_{k=0}^{N-1} X(k) e^{j2\pi \frac{nk}{N}}, n = 0, \ldots, N-1$$

The essence of inverse discrete Fourier transform is to transform the time domain sequence $\{x(n)\}$ to the frequency domain sequence $\{X(k)\}$. IFFT is a fast calculation method for IDFT. $\beta$ is a constant. Generally, $$\beta = 1, \beta = \frac{1}{\sqrt{N}}, \text{ or } \beta = \frac{1}{N}.$$

(4) GDFT: For a sequence $\{x(n), n=0, \ldots, N-1\}$ of N points, general discrete Fourier transform is as follows:

$$X(k) = \gamma \sum_{n=0}^{N-1} x(n) e^{-j2\pi \frac{(n+a)(k+b)}{N}}, k = 0, \ldots, N-1$$

a and b are real numbers. After the foregoing formula is deduced, the following may be obtained:

8

$$X(k) = e^{-j\frac{2\pi}{N}ak} e^{-j\frac{2\pi}{N}ab} \gamma \sum_{n=0}^{N-1} \underbrace{x(n) e^{-j\frac{2\pi}{N}nb}}_{\tilde{x}(n)} e^{-j\frac{2\pi}{N}nk}, k = 0, \ldots, N-1$$
$$\underbrace{\phantom{xxxxxxxxxxxxxxxxxxxxxxx}}_{\tilde{X}(k)}$$

It can be learned that the sequence $\{x(n)\}$ is first multiplied by the phase $$e^{-j\frac{2\pi}{N}nb}$$

to obtain $\{\tilde{x}(n)\}$. Then, DFT or FFT may be performed on the sequence $\{\tilde{x}(n)\}$ to obtain $\tilde{X}(k)$, and then $\tilde{X}(k)$ is multiplied by the phase $$e^{-j\frac{2\pi}{N}ak} e^{-j\frac{2\pi}{N}ab}$$

to obtain $X(k)$. In other words, GDFT may be calculated through DFT/FFT. When a=b=0, GDFT rolls back to DFT/FFT. In addition, general discrete Fourier transform is also equivalent to performing IDFT/IFFT on a sequence $\{x(n), n=a, \ldots, a+N-1\}$ of the N points, to obtain the following:

$$X(k) = \gamma \sum_{n=a}^{a+N-1} x(n) e^{-j2\pi \frac{nk}{N}}, k = b, \ldots, b+N-1$$

(5) GIDFT: For a sequence $\{X(k), k=0, \ldots, N-1\}$ of N points, general inverse discrete Fourier transform is as follows:

$$x(n) = \beta \sum_{k=0}^{N-1} X(k) e^{j2\pi \frac{(n+a)(k+b)}{N}}, n = 0, \ldots, N-1$$

a and b are real numbers. After the foregoing formula is deduced, the following may be obtained:

$$x(n) = e^{j\frac{2\pi}{N}nb} e^{j\frac{2\pi}{N}ab} \beta \sum_{n=0}^{N-1} \underbrace{X(k) e^{j\frac{2\pi}{N}ak}}_{\tilde{X}(K)} e^{j\frac{2\pi}{N}nk}, n = 0, \ldots, N-1$$
$$\underbrace{\phantom{xxxxxxxxxxxxxxxxxxxxxxx}}_{\tilde{x}(n)}$$

It can be learned that the sequence $\{X(k)\}$ is first multiplied by the phase $$e^{j\frac{2\pi}{N}ak}$$

to obtain $\{\tilde{X}(k)\}$. Then, IDFT or IFFT may be performed on the sequence $\{\tilde{X}(k)\}$ to obtain $\tilde{x}(n)$, and then $\tilde{x}(n)$ is multiplied by the phase $$e^{j\frac{2\pi}{N}nb} e^{j\frac{2\pi}{N}ab}$$

to obtain $x(n)$. In other words, GIDFT may be calculated through IDFT/IFFT. When a=b=0, GIDFT rolls back to IDFT/IFFT. In addition, general inverse discrete Fourier transform is also equivalent to performing DFT/FFT on a sequence $\{X(k), k=b, \ldots, b+N-1\}$ of the N points, to obtain the following:

$$x(n) = \beta \sum_{k=b}^{b+N-1} X(k)\, e^{j2\pi \frac{nk}{N}}, n = a, \ldots, a+N-1$$

It may be understood that, for brevity of description, in embodiments of this application, it is assumed that $\alpha=\beta=1$.

(6) A subcarrier width may be understood as a frequency range of frequency domain resources corresponding to a subcarrier. For example, if a subcarrier K1 corresponds to frequency domain resources of P0 and P1, a subcarrier width may be understood as a width of |P0-P1|.

"A plurality of" in embodiments of this application means two or more. "And/or" describes an association relationship between associated objects and indicates that three relationships may exist. For example, A and/or B may indicate the following three cases: Only A exists, both A and B exist, and only B exists. The character "/" generally indicates an "or" relationship between the associated objects. In addition, it should be understood that although the terms such as "first" and "second" may be used in embodiments of the present invention to describe objects, these objects are not limited by these terms. These terms are merely used to distinguish the objects from each other.

The terms "include", "have", and any variations thereof mentioned in descriptions of embodiments of this application are intended to cover a non-exclusive inclusion. For example, a process, method, system, product, or device that includes a series of steps or units is not limited to the listed steps or units, but optionally further includes other unlisted steps or units, or optionally further includes another step or unit inherent to the process, method, product, or device. It should be noted that, in embodiments of this application, the term "example", "for example", or the like is used to represent giving an example, an illustration, or a description. Any embodiment or design solution described as an "example" or with "for example" in embodiments of this application should not be explained as being more preferred or having more advantages than another embodiment or design solution. Exactly, use of the terms such as "example" or "for example" is intended to present a relative concept in a specific manner.

The technical solutions provided in embodiments of this application are explained and described below with reference to the accompanying drawings.

Figure 1:
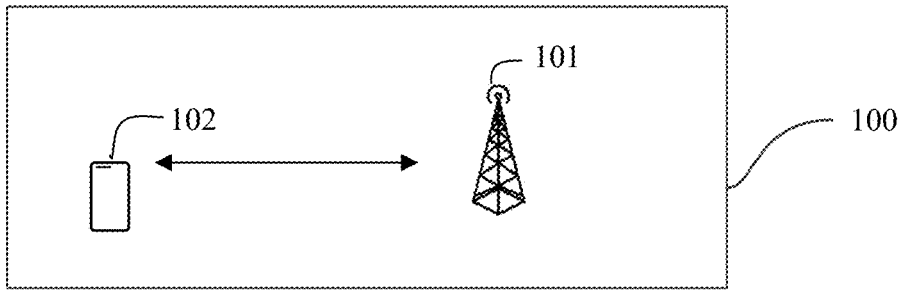
FIG. 1 is a diagram of a communication system according to an embodiment of this application.

With reference to FIG. 1, the following describes a communication system to which a signal transmission method provided in embodiments of this application is applied. Refer to FIG. 1. The communication system 100 includes a sending device 101 and a receiving device 102. The sending device 101 may be a network device or a terminal device, and the receiving device 102 may be a network device or a terminal device. Optionally, when the sending device 101 is a network device, the receiving device 102 may be a terminal device; or when the receiving device 102 is a network device, the sending device 101 may be a terminal device.

The terminal device in this application includes a device that provides a voice and/or data signal connectivity for a user. Specifically, the terminal device includes a device that provides a voice for a user, includes a device that provides data signal connectivity for a user, or includes a device that provides a voice and data signal connectivity for a user. For example, the terminal device may include a hand-held device with a wireless connection function or a processing device connected to a wireless modem. The terminal device may include user equipment (UE), a wireless terminal device, a mobile terminal device, a device-to-device (D2D) communication terminal device, a vehicle to everything (V2X) terminal device, a machine-to-machine/machine-type communication (M2M/MTC) terminal device, an internet of things (IoT) terminal device, a subscriber unit (subscriber unit), a subscriber station (subscriber station), a mobile station (mobile station), a remote station (remote station), an access point (AP), a remote terminal (remote terminal) device, an access terminal (access terminal) device, a user terminal (user terminal) device, a user agent (user agent), a user device (user device), a satellite, an uncrewed aerial vehicle, a balloon, an aircraft, or the like. For example, the terminal device may include a mobile phone (or referred to as a "cellular" phone), a computer having a mobile terminal device, or a portable, pocket-sized, handheld, or computer built-in mobile apparatus. For example, the terminal device may be a device such as a personal communications service (PCS) phone, a cordless telephone set, a session initiation protocol (SIP) telephone set, a wireless local loop (WLL) station, or a personal digital assistant (PDA). The terminal device may alternatively include a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner. By way of example but not limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology. If the various terminal devices described above are located in a vehicle (for example, placed in the vehicle or installed in the vehicle), the terminal devices may be all considered as vehicle-mounted terminal devices. For example, the vehicle-mounted terminal device is also referred to as an on-board unit (OBU).

The network device in this application includes, for example, an access network (AN) device, for example, a base station (for example, an access point), and may be a device that is in an access network and that communicates with a wireless terminal device over an air interface through one or more cells. Alternatively, for example, a network device in a vehicle-to-everything (V2X) technology is a roadside unit (RSU). The network device may include an evolved NodeB (NodeB or eNB or e-NodeB, evolved NodeB) in a long term evolution (LTE) system or long term evolution-advanced (LTE-A), may include a next generation NodeB (gNB) in an evolved packet core (EPC), a $5^{th}$ generation (5G) mobile communication technology, or a new radio (NR) system (also referred to as an NR system for short), or may include a central unit (CU) and a distributed unit (DU) in a cloud radio access network (Cloud RAN) system, a satellite, an uncrewed aerial vehicle, a balloon, an aircraft, or the like. This is not limited in embodiments of this application.

ISAC is widely regarded as a key application scenario of next generation wireless communication. Specifically, a sent radio signal has both sensing and communication capabilities. Simply speaking, a communication requirement is to send some information of a transmit end to a receive end. Simply speaking, a sensing requirement includes sensing an ambient environment, a movement speed of an object, a movement distance, and the like. An example in which a radar performs sensing is used. The radar sends an FMCW. A working principle is that a transmit end of the radar sends a continuous signal whose frequency increases linearly with time. When the signal is reflected by an object, due to a delay on a propagation path, there is a frequency difference $\Delta f$ between a reflected signal and the transmitted signal. The frequency difference is in positive correlation with the propagation delay, and may satisfy the following formula (1):

$$\Delta f = R \cdot \tau = \frac{BW}{T} \cdot \frac{2 \cdot d}{c} \qquad \text{Formula (1)}$$

R is a frequency change rate of the continuous frequency modulated signal, and a specific value is a ratio of a signal bandwidth (bandwidth, BW) to a signal periodicity T. d is a distance between the object and the transmit end, and c is a propagation speed of an electromagnetic wave. Frequency mixing is performed on the reflected signal that is received and the sent signal, to obtain the frequency difference between the two signals. The distance between the object and the transmit end can be calculated based on $\Delta f$.

Therefore, an FMCW-based linear frequency modulated signal, for example, a chirp (chirp) signal, is used as a waveform for ISAC, to implement both communication and sensing functions. How to generate a chirp signal carrying a data signal within a limited communication bandwidth becomes a problem that needs to be resolved.

An expression of the chirp signal carrying the data signal is shown in formula (2).

$$s(n) = \sum_{k=0}^{K-1} d_k e^{j2\pi\left(c_1 n^2 + \phi(k) + \frac{(k+k_0)n}{N}\right)} =$$

Formula (2)

$$e^{j2\pi c_1 n^2} \underbrace{\sum_{k=0}^{K-1} d_k e^{j2\pi\phi(k)} e^{j2\pi\frac{(k+k_0)n}{N}}}_{\tilde{s}(n)}$$

$$n = n_0, \dots, n_0 + L - 1, \dots, n_0 + L + N - 1$$

n is an integer and represents a time domain sampling index. A part $\{n_0, \dots, n_0+L-1\}$ is a cyclic prefix (cyclic prefix, CP) part of a chirp signal whose length is L. It can be learned from phase derivative calculation that, a frequency occupied by a $k^{th}$ data signal $d_k$ is $$\underbrace{d \, 2\pi\left(c_1 n^2 + \phi(k) + \frac{(k+k_0)n}{N}\right)}_{2\pi d n} = 2c_1 n + \frac{(k+k_0)}{N},$$

in other words, the frequency linearly changes with the time domain sampling index n.

$k_0$ determines a frequency position of data signal transmission, may be any value, and is generally an integer. $\tilde{s}(n)$ in the foregoing formula (2) is an OFDM signal with a CP. Therefore, the chirp signal may be obtained by performing phase shifting on the data signal $d_k$, performing GIDFT on a data signal obtained through phase shifting, and performing time-domain phase shifting after the transmit end further adds the CP to a data signal obtained through GIDFT.

Phase shifting is to multiply each data signal by one phase, that is, $d_k e^{j2\pi\phi(k)}$ Optionally, $\angle\phi(k)=0$.

GIDFT is to generate $\tilde{s}(n)$, where $n=n_0+L, \dots, n_0+L+N-1$. Adding the CP to $\tilde{s}(n)$ is to assign an L-length data signal of $n=n_0+N, \dots, n_0+L+N-1$ to $n=n_0, \dots, n_0+L-1$, that is, $\tilde{s}(n)=\tilde{s}(n+N)$, where $n=n_0, \dots, n_0+L-1$.

Time-domain phase shifting is to multiply, by one phase, namely, $e^{j2\pi c_1 n^2}$, a time domain signal to which the CP is added.

It may be understood that the foregoing is an expression form of a discrete digital signal. If the expression form of the discrete digital signal is converted into an expression of an analog signal, the expression of the analog signal satisfies the following formula (3):

$$s(t) = \sum_{k=0}^{K-1} d_k e^{j2\pi\left(\phi(k)+(k+k_0)\Delta ft + \tilde{c}_1 t^2\right)} \qquad \text{Formula (3)}$$

A principle of converting the discrete digital signal into the analog signal is to sample continuous signals s(t) at a sampling rate $f_3$ at a time interval $$T_s = 1/f_s \cdot \Delta f = \frac{f_s}{N} \cdot \tilde{c}_1 T_s^2 = c_1.$$

It can be learned that the following $s(nT_s)$ is equal to $s(n)$ of the discrete signal.

Formula (4)

$$s(nT_s) = \sum_{k=0}^{K-1} d_k e^{j2\pi\left(\phi(k)+(k+k_0)\Delta fnT_s + c_1 (nT_s)^2\right)} =$$

$$\sum_{k=0}^{K-1} d_k e^{j2\pi\left(\phi(k)+\frac{(k+k_0)n}{N}+\frac{\tilde{c}_1 T_s^2 n^2}{c_1}\right)}$$

Time-domain phase shifting causes spectrum expansion. Specifically, the signal to which the CP is added occupies only a bandwidth between K subcarriers. After a data signal is multiplied by one phase signal to form s(n), it can be learned that a frequency occupied by a data signal $d_k$ on a $k^{th}$ subcarrier is $$\underbrace{d \, 2\pi\left(c_1 n^2 + \phi(k) + \frac{(k+k_0)n}{N}\right)}_{2\pi d n} = 2c_1 n + \frac{(k+k_0)}{N},$$

Figure 2:
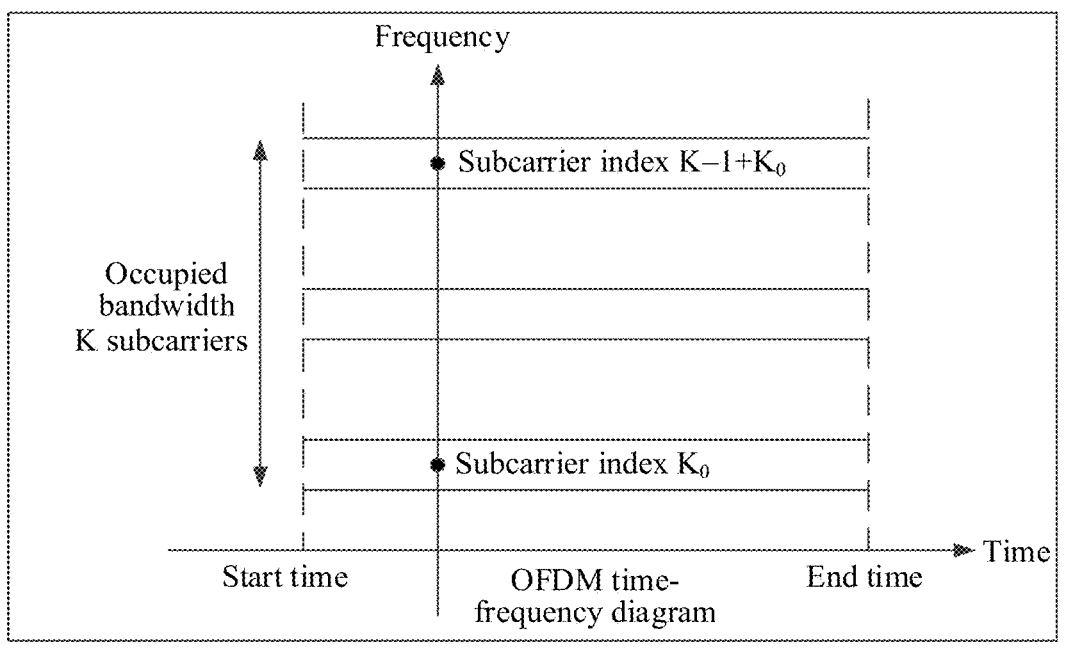
FIG. 2 is an OFDM time-frequency diagram and a chirp signal time-frequency diagram according to an embodiment of this application.
Figure 2:
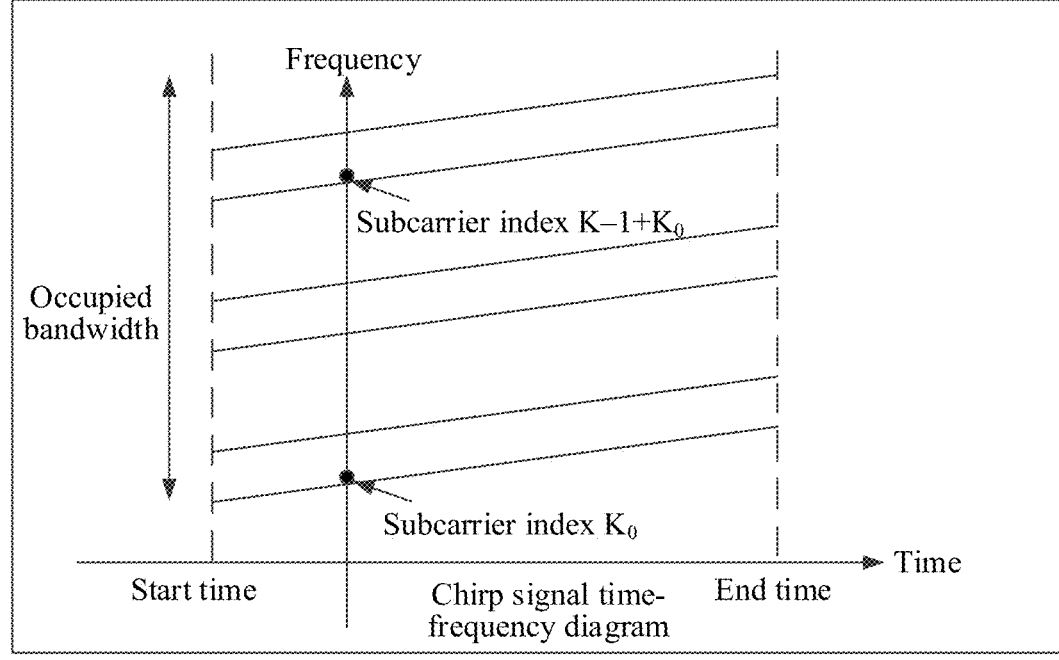

$n=n_0, \dots, n_0+L-1, \dots n_0+L+N-1$. Due to impact of $c_1$, the data signal $d_k$ no longer occupies only the $k^{th}$ subcarrier. As shown in a in FIG. 2, an OFDM signal occupies a frequency domain width from a $k^{th}$ subcarrier to a $(K+k_0-1)^{th}$ subcarrier. As shown in b in FIG. 2, a chirp signal s(n) occupies a width from a $(2c_1 n_0+k_0)^{th}$ subcarrier to a $(2c_1(n_0+L+N-1)+k_0+K-1)^{th}$ subcarrier, and the occupied bandwidth expands by $2c_1(L+N-1)$ subcarriers.

Figure 3:
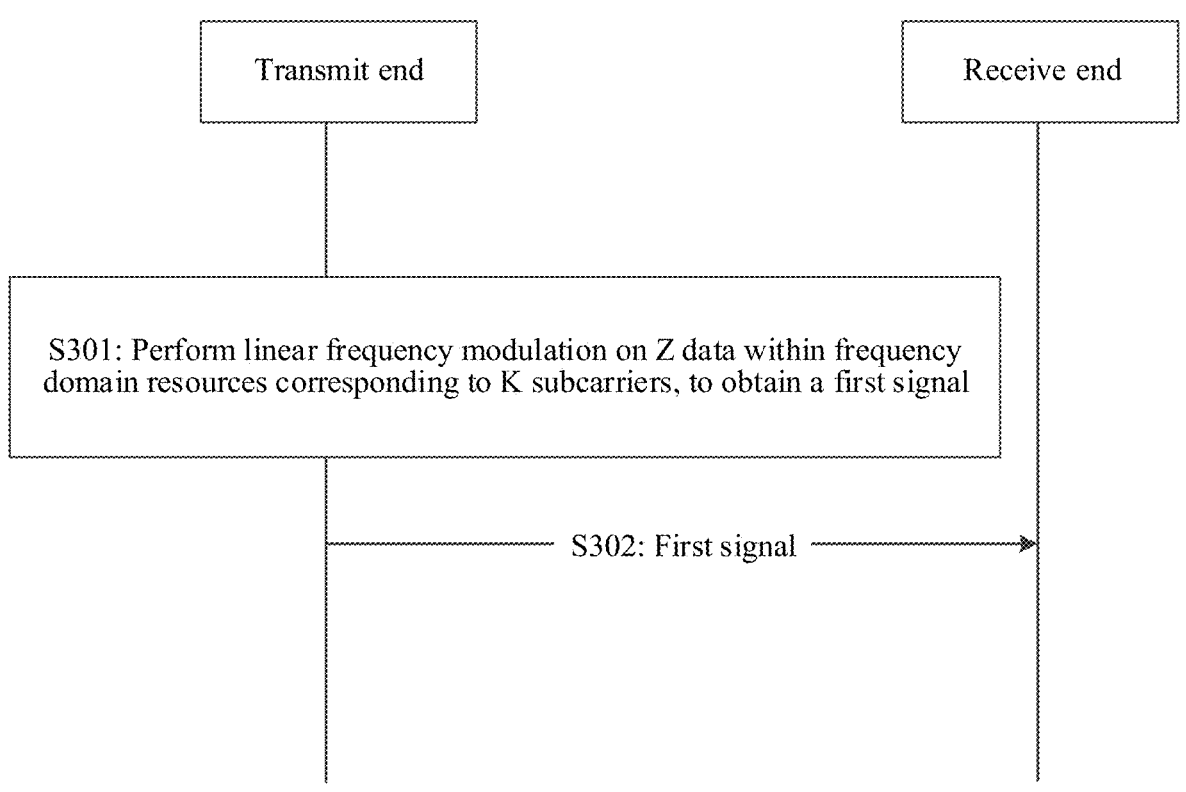
FIG. 3 is an example flowchart of a signal transmission method according to an embodiment of this application.

In view of this, an embodiment of this application provides a signal transmission method. In the method, a transmit end folds back a frequency that is of a chirp signal and that is outside of a frequency range of K subcarriers, so that the transmitted chirp signal does not occupy an additional bandwidth. FIG. 3 is an example flowchart of a signal transmission method according to an embodiment of this application. The method may include the following operations.

S301: A transmit end performs linear frequency modulation on Z data signals within frequency domain resources corresponding to K subcarriers, to obtain a first signal.

Z may be less than or equal to K. Z and K are integers greater than or equal to 1. Optionally, Z is an integer greater than or equal to 2.

It may be understood that a frequency occupied by each of data signals obtained through linear frequency modulation changes linearly with time.

In a possible implementation, the data signal in S301 may include K0 data signals known to a receiver, and remaining Z–K0 data signals may be data signals unknown to the receiver. Optionally, to facilitate generation of the first signal in S301, a value of the known data signal may be 0.

In an example, a $z^{th}$ data signal in the Z data signals corresponds to $M_z$ time segments. Slopes of linear changes of all of the $M_z$ time segments are the same. For example, a slope of a linear change of a frequency occupied by each data signal in an $(M_z-2)^{th}$ time segment is the same as a slope of a linear change of a frequency occupied by each data signal in an $(M_z-1)^{th}$ time segment. Similarly, the slope of the linear change of the frequency occupied by each data signal in the $(M_z-1)^{th}$ time segment is the same as a slope of a linear change of a frequency occupied by each data signal in an $M_z^{th}$ time segment, and so on. $M_z$ is an integer greater than or equal to 1. Optionally, $M_z$ is an integer greater than or equal to 2.

For example, when $M_z>1$, a start frequency of an $M_z^{th}$ segment is a lowest frequency in a frequency range of the frequency domain resources corresponding to the K subcarriers, and an end frequency of the $(M_z-1)^{th}$ segment is a highest frequency in the frequency range of the frequency domain resources corresponding to the K subcarriers. For another example, when $M_z>1$, a start frequency of a $M_z^{th}$ segment is a highest frequency in a frequency range of the frequency domain resources corresponding to the K subcarriers, and an end frequency of the $(M_z-1)^{th}$ segment is a lowest frequency in the frequency range of the frequency domain resources corresponding to the K subcarriers.

Figure 4:
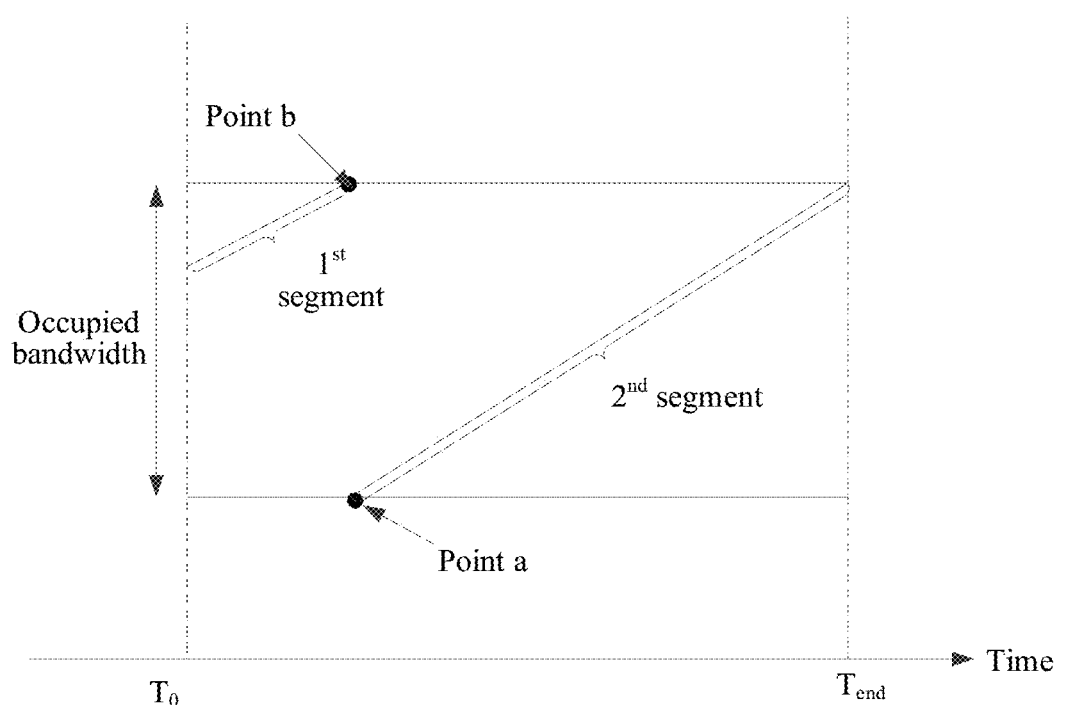
FIG. 4 is a diagram of time segments according to an embodiment of this application.

Refer to FIG. 4. Assuming that $M_Z$ is equal to 2, a start frequency of the $2^{nd}$ segment is a lowest frequency in the frequency range of the frequency domain resources corresponding to the K subcarriers, as shown by a point a in FIG. 4. An end frequency of a $1^{st}$ segment is a highest frequency in the frequency range of the frequency domain resources corresponding to the K subcarriers, as shown by a point b in FIG. 4.

S302: The transmit end sends a first signal.

Correspondingly, a receive end receives the first signal.

A frequency occupied by the first signal is within the frequency range of the frequency domain resources corresponding to the K subcarriers.

Based on the foregoing solution, the frequency occupied by the first signal generated by performing linear frequency modulation on the data signals by the transmit end is within the frequency range of the frequency domain resources corresponding to the K subcarriers. Compared with spectrum expansion caused by linear frequency modulation, a signal generated based on the technical solution shown in FIG. 3 does not need to occupy a frequency of more than K subcarriers. In other words, a frequency occupied by the signal is within the frequency range corresponding to the K subcarriers. Therefore, a waste of transmission resources can be reduced.

In a possible implementation, a manner in which the transmit end generates the first signal in S301 may be classified into the following manner 1 and manner 2. The following separately describes the manner 1 and manner 2. Manner 1:

In the manner 1, the transmit end may perform linear frequency modulation on each data signal $d_k$, and perform spectrum folding on a part outside of the frequency range corresponding to the K subcarriers, so that a frequency occupied by the part is still within the frequency range corresponding to the K subcarriers. It may be understood that time-frequency resources occupied by all data signals do not overlap but are still orthogonal. In other words, spectral lines of chirp signals generated based on all data signals do not overlap. The following specifically describes a manner of generating the first signal shown in the manner 1.

Figure 5:
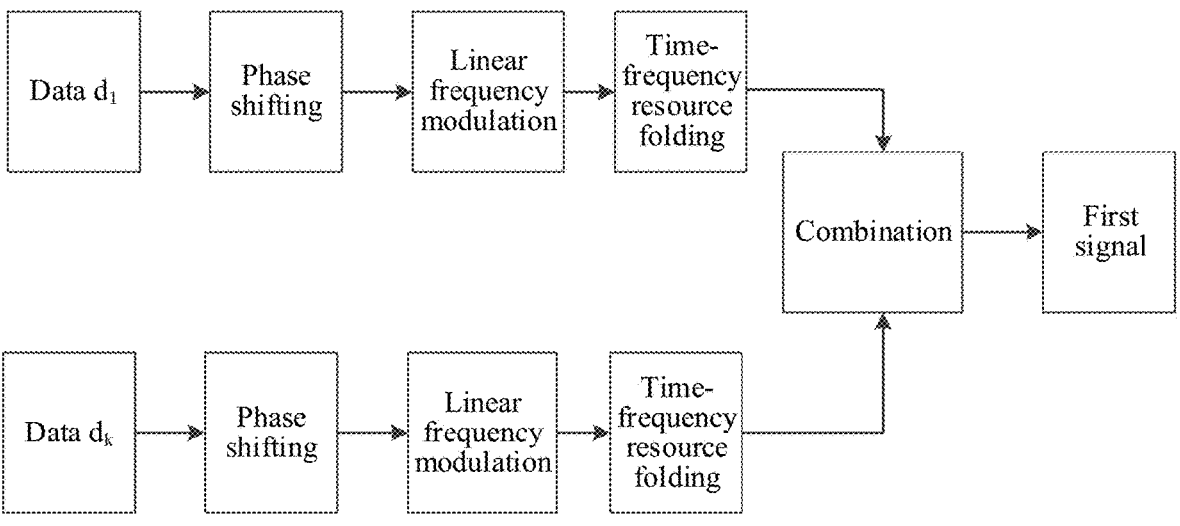
FIG. 5 is a flow block diagram of a signal transmission method according to an embodiment of this application.

FIG. 5 is an example flowchart of a method for generating a chirp signal according to an embodiment of this application. In the method, the transmit end separately performs phase shifting on a data signal $d_1$ to a data signal $d_k$. Phase shifting is to separately multiply the data signal $d_1$ to the data signal $d_k$ by $e^{j2\pi\phi(k)}$. In other words, phase shifting is performed on $d_k$, to obtain $d_k e^{j2\pi\phi(k)}$.

The transmit end performs linear frequency modulation on each data signal obtained through phase shifting. Linear frequency modulation is to modulate, to a time-frequency resource that changes with time, the data signal obtained through phase shifting. In other words, linear frequency modulation is performed on $d_k e^{j2\pi\phi(k)}$, to obtain $d_k e^{j2\pi\phi(k)} e^{j2\pi(k+k_0)\Delta ft} e^{j2\pi\tilde{c}_1 t^2}$.

It may be understood that, due to spectrum expansion, a frequency occupied by the data signal $d_1$ to the data signal $d_k$ obtained through linear frequency modulation is outside of the frequency range of the frequency domain resources corresponding to the K subcarriers. Therefore, the transmit end may fold, into the frequency range corresponding to the K subcarriers, a time-frequency resource occupied by a data signal outside of the frequency range corresponding to the K subcarriers. The transmit end combines signals generated based on all the data signals, to obtain the first signal.

In an example, to fold, into the frequency range corresponding to the K subcarriers, the time-frequency resource occupied by the data signal outside of the frequency range corresponding to the K subcarriers, the frequency occupied by the data signal obtained through linear frequency modulation may be increased by a frequency adjustment amount. The frequency adjustment amount herein may be an integer multiple of a subcarrier width.

For example, the transmit end may multiply, by $e^{j2\pi n_{kt} K\Delta ft}$, the data signal $d_k e^{j2\pi\phi(k)} e^{j2\pi(k+k_0)\Delta ft} e^{j2\pi\tilde{c}_1 t^2}$ obtained through frequency modulation. $n_{kt}$ is an integer, K is a quantity of subcarriers, and $\Delta f$ is the subcarrier width. $t \in [T_0, T_{end}]$, $T_0$ is start time of the chirp signal, and $T_{end}$ is end time of the chirp signal. The transmit end combines the signals respectively generated based on the data signal $d_1$ to the data signal $d_k$, to obtain the first signal $$s(t) = \sum_{k=0}^{K-1} d_k e^{j2\pi\phi(k)} e^{j2\pi(k+k_0)\Delta ft} e^{j2\pi\tilde{c}_1 t^2} e^{j2\pi n_{kt} K\Delta ft}.$$

The frequency $(k+k_0)\Delta f + 2\tilde{c}_1 t + n_{kt}K\Delta f$ occupied by the data signal $d_1$ to the data signal $d_k$ may be determined by performing phase derivative calculation on the first signal s(t). Herein, $n_{kt}K\Delta f$ (in a unit of Hz) may be understood as the frequency adjustment amount. Therefore, to limit the frequency occupied by the data signal $d_1$ to the data signal $d_k$ within the frequency range corresponding to the K subcarriers, that is, within $$\left[\left(k_0 - \frac{1}{2}\right)\Delta f, \left(k_0 - \frac{1}{2} + K\right)\Delta f\right],$$

a value of $n_{kt}$ may be uniquely determined. In other words, the transmit end may determine the value of $n_{kt}$, so that $$(k + k_0)\Delta f + 2\tilde{c}_1 t + n_{kt}K\Delta f \in \left[\left(k_0 - \frac{1}{2}\right)\Delta f, \left(k_0 - \frac{1}{2} + K\right)\Delta f\right].$$

In this embodiment of this application, $n_{kt}$ may be related to time. The value of $n_{kt}$ may be a negative number or may be a positive number. When the value of $n_{kt}$ is a negative number, it may be understood as that a frequency occupied by a data signal is migrated to a frequency lower than the frequency occupied by the data signal. When the value of $n_{kt}$ is a positive number, it may be understood as that a frequency occupied by a data signal is migrated to a frequency higher than the frequency occupied by the data signal.

It should be noted that $k_0$ is a subcarrier index corresponding to a subcarrier with a lowest frequency in the K subcarriers, and $k_0$ is an integer. It may be understood that, in the foregoing $$\left[\left(k_0 - \frac{1}{2}\right)\Delta f, \left(k_0 - \frac{1}{2} + K\right)\Delta f\right],$$

a smaller subcarrier index indicates a lower frequency of a subcarrier corresponding to the subcarrier index.

It may be understood that in this embodiment of this application, $(k+k_0)\Delta f + 2\tilde{c}_1 t + n_{kt}K\Delta f$ may also be limited within $$\left[\left(k_0 - \frac{1}{2} + K\right)\Delta f, \left(k_0 - \frac{1}{2}\right)\Delta f\right].$$

$k_0$ is a subcarrier index corresponding to a subcarrier with a highest frequency in the K subcarriers. In this case, a smaller subcarrier index indicates a higher frequency of a subcarrier corresponding to the subcarrier index.

The foregoing s(t) may be an analog signal. If s(t) is converted to a data signal, the following expression may be obtained:

$$s(n) = \sum_{k=0}^{K-1} d_k e^{j2\pi\phi(k)} e^{\frac{j2\pi(k+k_0)n}{N}} e^{j2\pi c_1 n^2} e^{\frac{j2\pi n_{kt}Kn}{N}}$$

In the foregoing expression s(n), $d_k e^{j2\pi\phi(k)}$ may be understood as performing phase shifting on the data signal.

$$e^{j2\pi\phi(k)} e^{\frac{j2\pi(k+k_0)n}{N}} e^{j2\pi c_1 n^2}$$

may be understood as performing linear frequency modulation on the data signal obtained through phase shifting.

$$e^{\frac{j2\pi n_{kt}Kn}{N}}$$

may be understood as folding, back into the frequency range corresponding to the K subcarriers, a frequency that is occupied by the data signal and that is outside of the frequency range corresponding to the K subcarriers.

Similarly, the transmit end may determine, by performing phase derivative calculation on s(n), the frequency $(k+k_0)+2c_1 nN+n_{kt}K$ occupied by the data signal $d_1$ to the data signal $d_k$. Herein, $n_{kt}K$ (in a unit of subcarrier) may be understood as the frequency adjustment amount. Therefore, the transmit end may uniquely determine a value of $n_{kt}$, so that $(k+k_0)+2c_1 nN+n_{kt}K$ is limited within the range corresponding to the K subcarriers. In other words, the transmit end may determine the value of $n_{kt}$, so that $(k+k_0)+2c_1 nN+n_{kt}K \in [k_0, k_0+K-1]$.

It should be noted that $k_0$ is a subcarrier index of a subcarrier with a lowest frequency in the K subcarriers. A smaller subcarrier index indicates a lower frequency of a subcarrier corresponding to the subcarrier index.

It may be understood that in this embodiment of this application, $(k+k_0)+2c_1 nN+n_{kt}K$ may also be limited within $[k_0+K-1, k_0]$. $k_0$ is a subcarrier index corresponding to a subcarrier with a highest frequency in the K subcarriers. In this case, a smaller subcarrier index indicates a higher frequency of a subcarrier corresponding to the subcarrier index.

Figure 6A:
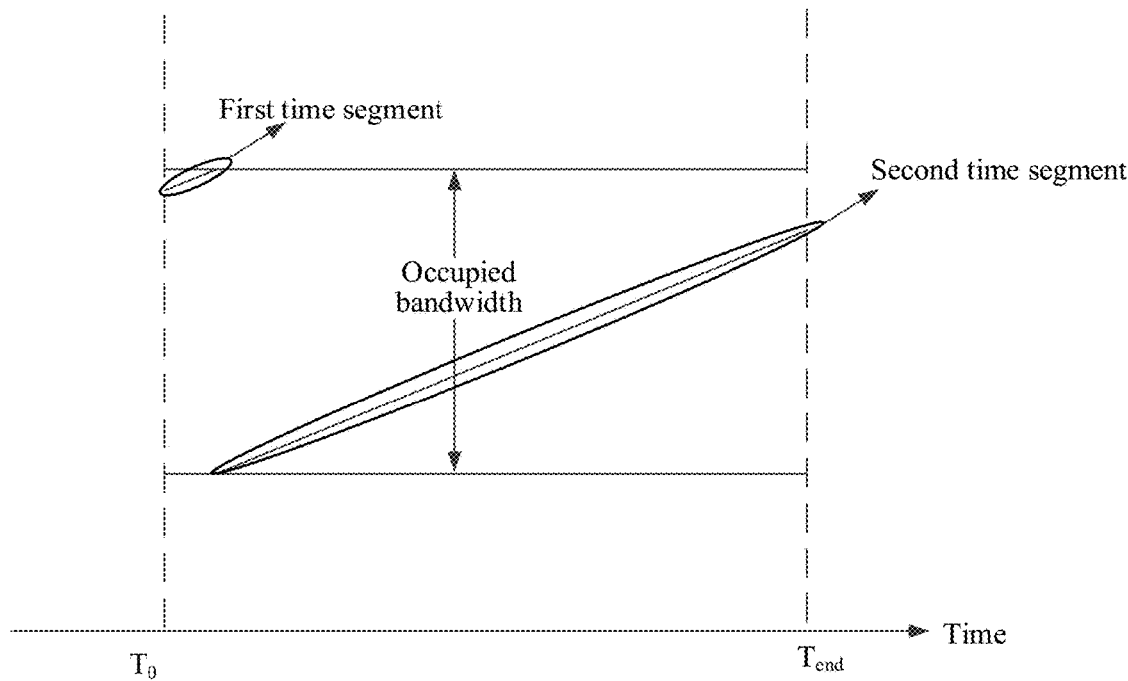
FIG. 6A is a diagram of time segments according to an embodiment of this application.

In an example, in the $M_z$ time segments, for a signal generated based on a same data signal, a start frequency of a first time segment is higher than a start frequency of a second time segment; or a start frequency of a first time segment is lower than a start frequency of a second time segment. It may be understood that the first time segment and the second time segment are two different time segments of the signal generated based on the same data signal. It should be noted that the signal corresponding to the first time segment and the signal corresponding to the second time segment may be discontinuous in terms of a frequency. Refer to FIG. 6A. A signal shown in FIG. 6A is a signal generated based on a same data signal. The signal corresponds to two time segments in total: a first time segment and a second time segment. It can be learned that a start frequency of the first time segment is higher than a start frequency of the second segment. In addition, it can be learned that time domain resources corresponding to the first time segment and the second time segment overlap.

Figure 6B:
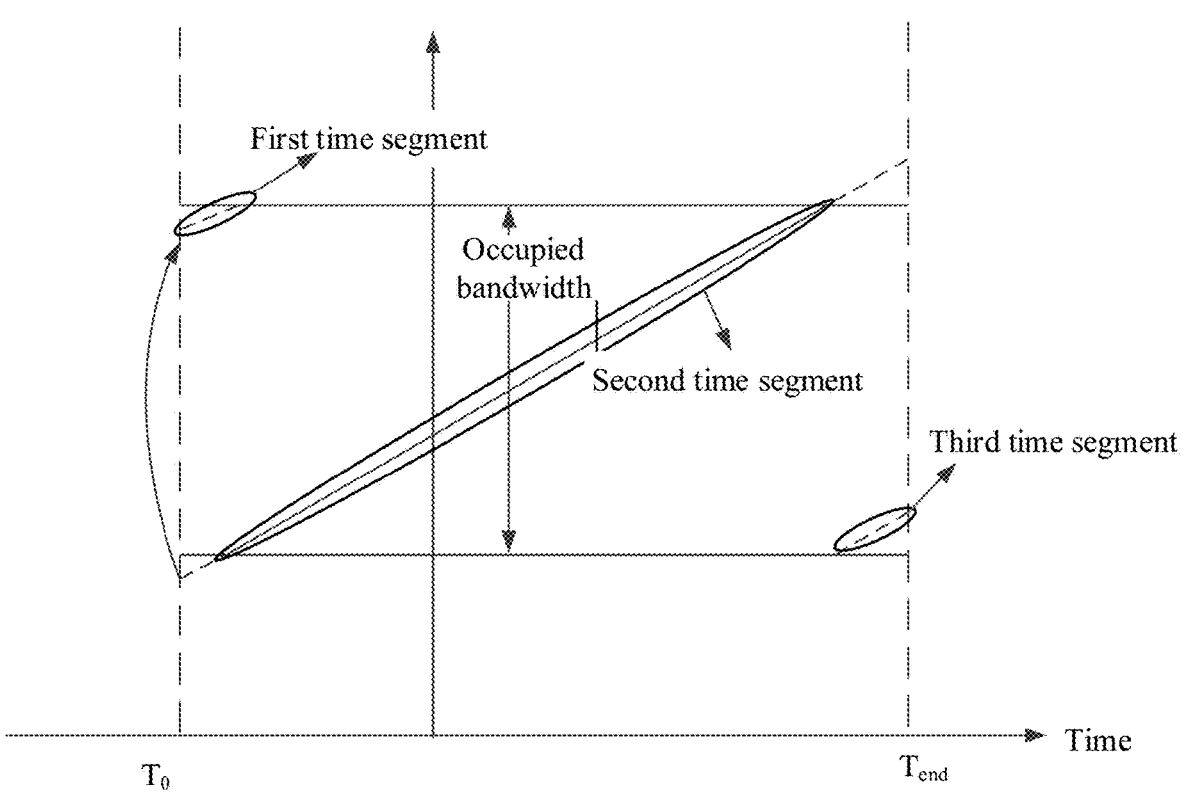
FIG. 6B is a diagram of time segments according to an embodiment of this application.

In another example, for a signal generated based on a same data signal, if a frequency occupied by the signal is folded, a frequency-folded part of the signal corresponds to a first time segment, and a frequency-unfolded part of the signal corresponds to a second time segment. In a possible case, for a signal generated based on a same data signal, if a frequency occupied by the signal is folded, a frequency-folded part of the signal corresponds to the first time segment and a third time segment. Apart, of the signal, with a folded frequency being higher than the frequency that exists before frequency folding corresponds to the first time segment. A part, of the signal, with a folded frequency being lower than the frequency that exists before frequency folding corresponds to the third time segment. A frequency-unfolded part of the signal corresponds to the second time segment. Refer to FIG. 6B. A signal shown in FIG. 6B is a signal generated based on a data signal $d_1$. A frequency occupied by a part of the data signal $d_1$ is outside of the frequency range corresponding to the K subcarriers. Therefore, frequency folding may be performed on a signal outside of the frequency range corresponding to the K subcarriers. It can be learned from FIG. 6B that, in the signal generated based on the data signal $d_1$, a part, of the signal, with a folded frequency being higher than the frequency that exists before frequency folding corresponds to the first time segment, a part, of the signal, with a folded frequency being lower than the frequency that exists before frequency folding corresponds to the third time segment, and a frequency-unfolded part of the signal corresponds to the second time segment.

Figure 7:
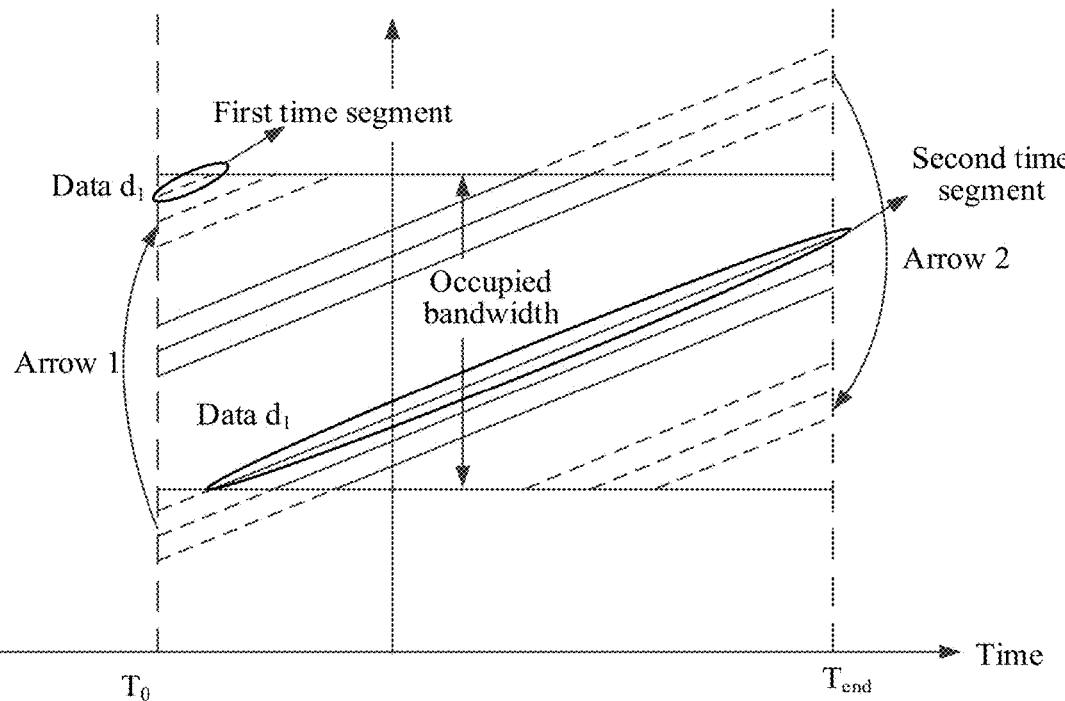
FIG. 7 is a time-frequency diagram of a first signal according to an embodiment of this application.

In the foregoing manner 1, the transmit end may fold, back into the frequency range corresponding to the K subcarriers, the frequency that is occupied by the data signal and that is outside of the frequency range corresponding to the K subcarriers. Refer to FIG. 7. It can be learned that a frequency occupied by a part of the data signal is outside of the frequency range corresponding to the K subcarriers. To save transmission resources, in the foregoing manner 1, the frequency occupied by the part of the data signal may be folded back into the frequency range corresponding to the K subcarriers, as shown by an arrow 1 and an arrow 2 in FIG. 7. Frequency folding is performed on a signal generated based on each data signal. The signal generated based on the data signal $d_1$ is used as an example. A frequency-folded part of the signal corresponds to the first time segment, and a frequency-unfolded part of the signal corresponds to the second time segment. It can be learned from FIG. 7 that signals generated based on all data signals have different frequency-folded parts. Therefore, it may be considered that the signals generated based on all the data signals correspond to different first time segments, and the signals generated based on all the data signals correspond to different second time segments.

In addition, it can be seen from FIG. 7 that chirp signal spectral lines obtained through frequency folding do not overlap. In other words, time-frequency resources occupied by the data signal $d_1$ to the data signal $d_k$ do not overlap. Therefore, the first signal generated in the manner 1 does not affect performance, and may be used to transmit a data signal, in other words, may be used for communication. In addition, the chirp signal may also be used for sensing. Therefore, the first signal generated in the manner 1 may be used for communication and sensing.

In S302, the receive end may receive the first signal. In this case, the receive end may filter the received first signal. For example, when the first signal is an analog signal, the receive end may perform analog signal filtering on the first signal. When the first signal is a digital signal, the receive end may perform digital signal filtering on the first signal. The receive end may extract a data signal whose frequency is within the frequency range corresponding to the K subcarriers, and then generate a second signal at a sampling rate equivalent to $f_s=K\Delta f$ Hz. The second signal is extended in frequency domain in a periodicity of $f_s$, in other words, a frequency occupied by the second signal is outside of the frequency range corresponding to the K subcarriers. In other words, a frequency range occupied by the second signal is the same as a frequency range that exists before the transmit end performs frequency folding on a data signal obtained through linear frequency modulation. Therefore, the receive end may reconstruct the chirp signal that exists before frequency folding. The receive end may perform data signal demodulation on the chirp signal, to obtain each data signal.

It should be noted that processing performed by the receive end on the first signal may be considered as a reverse operation relative to the transmit end.

Based on the foregoing technical solution, frequency folding is performed on a time-frequency signal whose frequency is outside of a frequency range of an occupied bandwidth, in other words, translation is performed at a width of an integer multiple of an occupied signal bandwidth, the analog signal is $n_{kt}K\Delta f$, and the digital signal is $n_{kt}K$, so that time-frequency resources that all data signals pass through do not overlap and are still orthogonal. The receive end processes the first signal to construct a time-frequency signal that exists before the transmit end performs frequency folding, so that performance is not lost, no additional bandwidth is occupied, and a frequency domain resource occupied by the data signal is limited within the occupied bandwidth.

Figure 8:
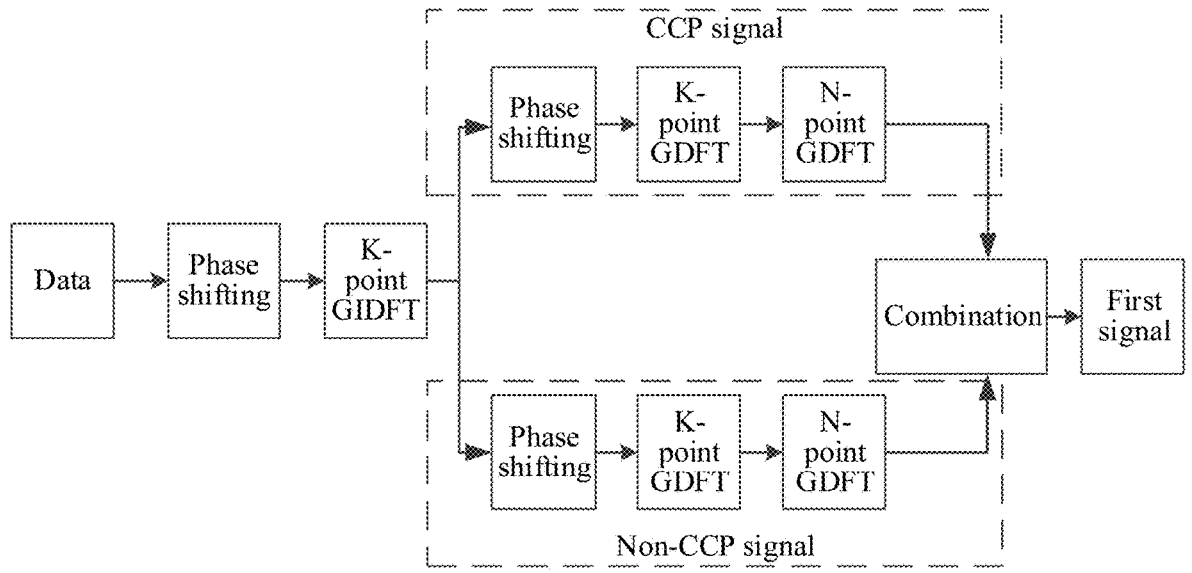
FIG. 8 is a flow block diagram of a signal transmission method according to an embodiment of this application.

The modulation method in the foregoing manner 1 is to combine signals generated based on the data signals after linear frequency modulation is performed on the data signals. In the manner 2, a chirp cyclic prefix (CCP) part and a non-CCP part of the chirp signal may be separately generated. The following provides specific descriptions. Manner 2:

FIG. 8 is an example flowchart of a method for generating a chirp signal according to an embodiment of this application. In the method, the transmit end performs phase shifting on a data signal $d_1$ to a data signal $d_k$. Phase shifting is to multiply the data signal $d_k$ by $e^{j2\pi\phi(k)}$. In other words, phase shifting is performed on $d_k$, to obtain $d_k e^{j2\pi\phi(k)}$. The transmit end transforms, to a time domain by performing K-point GIDFT, the K data signals $\{d_k\}$ obtained through phase shifting, to generate a second signal $$s_1(n) = \sum_{k=0}^{K-1} d_k e^{j2\pi\phi(k)} e^{j2\pi\left(\frac{kn}{K}\right)},$$

$\forall$n.

$$s_1(n) = s_1(n+K), \forall\, n.$$

In a possible case, the transmit end performs phase shifting on the second signal based on CCP time $\{n_2, \ldots, n_2+K-1\}$, to generate a fifth signal. Phase shifting performed by the transmit end on the second signal may be $e^{j2\pi n_{kt}K\Delta ft}$ or $$e^{\frac{j2\pi n_{kt}Kn}{N}}$$

shown in the manner 1. The CCP time may be understood as a time domain resource occupied by the CCP. The fifth signal generated by the transmit end by performing phase shifting on the second signal based on the CCP time $\{n_2, \ldots, n_2+K-1\}$ is $$x_1(n) = e^{j2\pi(c_1 n^2)}\sum_{k=0}^{K-1} d_k e^{j2\pi\phi(k)} e^{j2\pi\left(\frac{kn}{N}\right)},$$

$n=n_2, \ldots, n_2+K-1$. $n_2, \ldots, n_2+K-1$ is the CCP time. The transmit end transforms the fifth signal to a frequency domain by performing K-point GDFT and maps the fifth signal onto the K subcarriers, to obtain a sixth signal, and the transmit end transforms the sixth signal back to a time domain by performing N-point GIDFT, to obtain a cyclic prefix signal with L points. Time corresponding to the L points is $\{\tilde{n}_2, \tilde{n}_2+L-1\}$.

In another possible case, the transmit end performs phase shifting on the second signal based on non-CCP time $\{n_1, \ldots, n_1+K-1\}$, to generate a third signal. Phase shifting performed by the transmit end on the second signal may be $e^{j2\pi n_{ki}K\Delta ft}$ or $$e^{\frac{j2\pi n_{ki}Kn}{N}}$$

shown in the manner 1. The non-CCP time may be understood as a time domain resource, occupied by another data signal, other than a time domain resource occupied by the CCP. The third signal generated by the transmit end by performing phase shifting on the second signal based on the non-CCP time $\{n_1, \ldots, n_1+K-1\}$ is $$s_1(n) = e^{j2\pi(c_1 n^2)}\sum_{k=0}^{K-1}d_k e^{j2\pi\phi(k)}e^{j2\pi\left(\frac{kn}{K}\right)},$$

$n=n_1, \ldots, n_1+K-1$. $n_1, \ldots, n_1+K-1$ is the non-CCP time. The transmit end transforms the third signal to a frequency domain by performing K-point GDFT and maps the third signal onto the K subcarriers, to obtain a fourth signal, and the transmit end transforms the fourth signal back to a time domain by performing N-point GIDFT, to obtain a non-CCP signal with N points.

The following separately describes a manner of generating a CCP signal and a manner of generating a non-CCP signal. It may be understood that L is a length of the CCP signal, N is a length of the non-CCP signal, and L and N are integers greater than or equal to 0. It should be noted that the length of the CCP signal and the length of the non-CCP signal are not continuous, but discrete. In other words, L may be a quantity of points of the CCP signal, and N may be a quantity of points of the non-CCP signal.

In a possible case, refer to FIG. 8. The transmit end may transform the third signal $$s_1(n) = e^{j2\pi(c_1 n^2)}\sum_{k=0}^{K-1}d_k e^{j2\pi\phi(k)}e^{j2\pi\left(\frac{kn}{K}\right)},$$

$n=n_1, \ldots, n_1+K-1$ to the frequency domain by performing K-point GDFT. That is, K-point GDFT is performed on the third signal to obtain the fourth signal $$s_2(k) = \sum_{n=n_1}^{n_1+K-1}s_1(n)e^{-j2\pi\left(\frac{kn}{N}\right)},$$

$\forall k$. $s_2(k)=s_2(k+K)$, $\forall k$. The transmit end transforms the fourth signal to the time domain by performing N-point GIDFT, to obtain the non-CCP signal:

$$s_3(n) = \sum_{k=k_1}^{K+k_1-1}s_2(k)e^{j2\pi\frac{(k-k_1+k_0)n}{N}} \qquad \text{Expression (1)}$$

$$= \sum_{k=k_1}^{K+k_1-1}e^{j2\pi\frac{(k-k_1+k_0)n}{N}}\sum_{l=n_1}^{n_1+K-1}$$

$$\left\{e^{j2\pi(c_1 l^2)}e^{-j2\pi\left(\frac{kl}{K}\right)}\sum_{m=0}^{K-1}\left[d_m e^{j2\pi\phi(m)}e^{j2\pi\left(\frac{ml}{K}\right)}\right]\right\}$$

$$n = 0, \ldots, N-1$$

$n=0, \ldots, N-1$ in the foregoing expression (1) indicates a moment corresponding to one of N points of a non-CCP signal.

In another possible case, refer to FIG. 8. The transmit end may transform the fifth signal $$x_1(n) = e^{j2\pi(c_1 n^2)}\sum_{k=0}^{K-1}d_k e^{j2\pi\phi(k)}e^{j2\pi\left(\frac{kn}{N}\right)},$$

$n=n_2, \ldots, n_2+K-1$ to the frequency domain by performing K-point GDFT. That is, K-point GDFT is performed on the fifth signal to obtain the sixth signal $$x_2(k) = \sum_{n=n_2}^{n_2+K-1}x_1(n)e^{-j2\pi\left(\frac{kn}{N}\right)},$$

$\forall k$. $x_2(k)=x_2(k+K)$, $\forall k$. The transmit end transforms the sixth signal to the time domain by performing N-point GIDFT, to obtain the CCP signal:

$$x_3(n) = \sum_{k=k_1}^{K+k_1-1}x_2(k)e^{j2\pi\frac{(k-k_1+k_0)n}{N}} \qquad \text{Expression (2)}$$

$$= \sum_{k=k_1}^{K+k_1-1}e^{j2\pi\frac{(k-k_1+k_0)n}{N}}\sum_{l=n_2}^{n_2+K-1}$$

$$\left\{e^{j2\pi(c_1 l^2)}e^{-j2\pi\left(\frac{kl}{K}\right)}\sum_{m=0}^{K-1}\left[d_m e^{j2\pi\phi(m)}e^{j2\pi\left(\frac{ml}{K}\right)}\right]\right\}$$

$$n = \tilde{n}_2, \ldots, \tilde{n}_2 + L - 1$$

$n=\tilde{n}_2, \ldots, n_2+L-1$ in the expression (2) indicates a moment corresponding to one of L points of a CCP signal. L is the length of the CCP.

In the foregoing expression (1 and expression 2), $k_1$ is a real number. Optionally, $k_1=0$, $k_1=-N/2$, $k_1=N/2$, $$k_1 = -\frac{N-1}{2}, \text{ or } k_1 = \frac{N+1}{2}.$$

Refer to FIG. 8. After generating the CCP signal and the non-CCP signal in the foregoing manner, the transmit end may combine the CCP signal and the non-CCP signal to generate a chirp signal, namely, the first signal in S301.

Assuming that the first signal s(n) starts from an index of a moment $n_0$ and the length of the CCP signal is L, the first signal may satisfy the following expression (3):

$$s(n) = \begin{cases} x_3(n + \tilde{n}_2) & \text{if } n = n_0, \ldots, n_0 + L - 1 \\ s_3(n - n_0 - L) & \text{if } n = n_0 + L, \ldots, n_0 + L + N - 1 \end{cases} \quad \text{Expression (3)}$$

The transmit end maps K frequency domain signals of the first signal onto the K subcarriers, that is, adds zeros to N–K subcarriers. An operation of mapping, by the transmit end, the frequency domain signals onto the K subcarriers is equivalent to performing time-domain interpolation on K time domain signals corresponding to the frequency domain signals to obtain N time domain signals. In other words, a distance between adjacent time domain signals in the N time domain signals obtained through interpolation changes from one time domain unit to K/N time domain units.

Therefore, to enable the non-CCP signal and the CCP signal with a length of L to be continuous in time domain, the following formula (5) needs to be satisfied:

$$n_2 + \frac{K}{N}(\tilde{n}_2 + L - 1) = n_1 - \frac{K}{N} => \tilde{n}_2 = \frac{(n_1 - n_2)N}{K} - L \quad \text{Formula (5)}$$

In the foregoing formula (5), $n_1$ is a start moment of the non-CCP signal, $n_2$ is an end moment of the non-CCP signal, and $\tilde{n}_2$ is a moment corresponding to one of the L points of the CCP signal. In the foregoing formula (5), $$\frac{K}{N}(\tilde{n}_2 + L - 1)$$

may be understood as a distance occupied by the CCP signal, in other words, duration occupied by the CCP signal.

Based on the foregoing formula (5), when the transmit end maps the K frequency domain signals of the first signal onto the K subcarriers, the non-CCP signal and the CCP signal can be continuous in time domain. In addition, because the transmit end maps the first signal onto the K subcarriers, to be specific, the frequency domain resource occupied by the first signal is within the frequency range corresponding to the K subcarriers, transmission resources can be saved.

In a possible implementation, to enable the non-CCP signal and the CCP signal with a length of L to be continuous in time domain, $n_2$, $n_1$, and $\tilde{n}_2$ in the formula (5) may satisfy any one of the following case 1 to case 4.

Case 1: $n_1=0$, $n_2=-K$, and $\tilde{n}_2=N-L$.

In the case 1, the start moment of the non-CCP signal may be 0, and the end moment of the non-CCP signal may be –K. In this case, the moment corresponding to one of the L points of the CCP signal is $$\tilde{n}_2 = \frac{(n_1 - n_2)N}{K} - L = \frac{(0 - (-K))N}{K} - L = N - L.$$

Case 2: $n_1=K$, $n_2=0$, and $n_2=N-L$.

In the case 2, the start moment of the non-CCP signal may be K, and the end moment of the non-CCP signal may be 0. In this case, the moment corresponding to one of the L points of the CCP signal is $$\tilde{n}_2 = \frac{(n_1 - n_2)N}{K} - L = \frac{(K - 0)N}{K} - L = N - L.$$

Case 3: $n_1=0$, $n_2=-K/2$, and $\tilde{n}_2=N/2-L$.

In the case 3, the start moment of the non-CCP signal may be 0, and the end moment of the non-CCP signal may be –K/2. In this case, the moment corresponding to one of the L points of the CCP signal is $$\tilde{n}_2 = \frac{(n_1 - n_2)N}{K} - L = \frac{(0 - (-K/2))N}{K} - L = N/2 - L.$$

Optionally, K and N are even numbers. In this case, $n_2$ and $\tilde{n}_2$ are integers, and an operation is simple.

Case 4: $n_1=K$, $$n_2 = \frac{K}{2},$$

and $\tilde{n}_2=N/2-L$.

In the case 4, the start moment of the non-CCP signal may be K, and the end moment of the non-CCP signal may be K/2. In this case, the moment corresponding to one of the L points of the CCP signal is $$\tilde{n}_2 = \frac{(n_1 - n_2)N}{K} - L = \frac{(K - K/2)N}{K} - L = N/2 - L.$$

Optionally, K and N are even numbers. In this case, $n_2$ and $\tilde{n}_2$ are integers, and an operation is simple.

$\tilde{n}_2$, to be specific, the moment corresponding to one of the L points of the CCP signal, obtained based on the foregoing case 1 to case 4 may be integers. This helps map the generated CCP signal and the generated non-CCP signal onto the time domain resource.

The transmit end generates a digital signal in the foregoing manner (2), and the transmit end may send the digital signal to the receive end. Optionally, the transmit end may convert the digital signal into an analog signal by using a digital-to-analog converter, and send the analog signal to the receive end. In S302, the receive end may receive the first signal. In this case, the receive end may filter the received first signal. For example, when the first signal is an analog signal, the receive end may perform analog signal filtering on the first signal. When the first signal is a digital signal, the receive end may perform digital signal filtering on the first signal. The receive end may extract a data signal whose frequency is within the frequency range corresponding to the K subcarriers, and then generate a second signal at a sampling rate equivalent to $f_s=K\Delta f$ Hz. The receive end may perform data signal demodulation on the second signal, to obtain each data signal.

It should be noted that processing performed by the receive end on the first signal may be considered as a reverse operation relative to the transmit end.

Based on the foregoing technical solution, the transmit end generates the first signal by using digital signal processing means such as GIDFT and GDFT, so that signal generation complexity can be reduced. Because both the frequency domain resource occupied by the CCP signal and the frequency domain resource occupied by the non-CCP signal are within the frequency range corresponding to the K subcarriers, a resource waste caused by spectrum expansion can be avoided.

Figure 9:
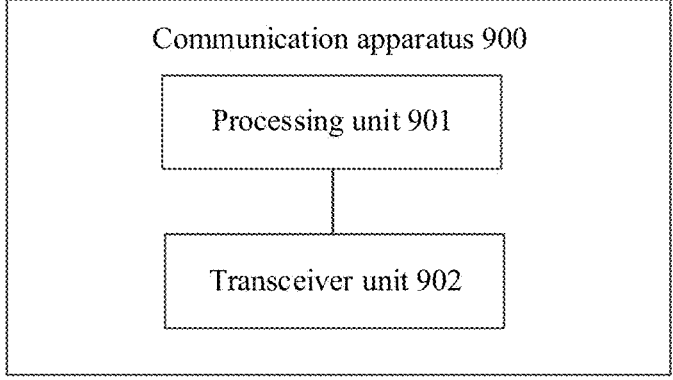
FIG. 9 is a block diagram of a communication apparatus according to an embodiment of this application.

Based on a concept of the foregoing embodiment, refer to FIG. 9. An embodiment of this application provides a communication apparatus 900. The apparatus 900 includes a processing unit 901 and a transceiver unit 902. The apparatus 900 may be a device at a transmit end, or may be an apparatus that is used in the device at the transmit end and that can support the device at the transmit end in performing a signal transmission method. Alternatively, the apparatus 900 may be a device at a receive end, or may be an apparatus that is used in the device at the receive end and that can support the device at the receive end in performing a signal transmission method.

The transceiver unit may also be referred to as a transceiver module, a transceiver, a transceiver machine, a transceiver apparatus, or the like. The processing unit may also be referred to as a processor, a processing board, a processing unit, a processing apparatus, or the like. Optionally, a component that is in the transceiver unit and that is configured to implement a receiving function may be considered as a receiving unit. It should be understood that the transceiver unit is configured to perform a sending operation and a receiving operation on a transmit end side or a receive end side in the foregoing method embodiments. A component that is in the transceiver unit and that is configured to implement a sending function is considered as a sending unit. In other words, the transceiver unit includes the receiving unit and the sending unit. When the apparatus 900 is used in the transmit end, the sending unit included in the transceiver unit 902 of the apparatus 900 is configured to perform a sending operation on the transmit end side, for example, sending a first signal, which may be specifically sending the first signal to the receive end. When the apparatus 900 is used in the receive end, the receiving unit included in the transceiver unit 902 of the apparatus 900 is configured to perform a receiving operation on the receive end side, for example, obtaining a first signal, which may be specifically obtaining the first signal from the transmit end.

In addition, it should be noted that, if the apparatus is implemented by using a chip/chip circuit, the transceiver unit may be an input/output circuit and/or a communication interface, and perform an input operation (corresponding to the foregoing receiving operation) and an output operation (corresponding to the foregoing sending operation); and the processing unit is an integrated processor, a microprocessor, or an integrated circuit.

The following describes in detail an implementation in which the apparatus 900 is used in the transmit end or the receive end.

For example, when the apparatus 900 is used in the transmit end, operations performed by the units of the apparatus 900 are described in detail.

The processing unit 901 is configured to perform linear frequency modulation on Z data signals within frequency domain resources corresponding to K subcarriers, to obtain a first signal. The transceiver unit 902 is configured to send the first signal. A frequency occupied by the first signal is within a frequency range of the frequency domain resources corresponding to the K subcarriers, and a frequency occupied by each of Z data signals obtained through linear frequency modulation changes linearly with time. A $z^{th}$ data signal in the Z data signals corresponds to $M_z$ time segments, and slopes of linear changes of all of the $M_z$ time segments are the same. When $M_z>1$, a start frequency of an $M_z^{th}$ segment is a lowest frequency in the frequency range, and an end frequency of an $(M_z-1)^{th}$ segment is a highest frequency in the frequency range; or a start frequency of an $M_z^{th}$ segment is a highest frequency in the frequency range, and an end frequency of an $(M_z-1)^{th}$ segment is a lowest frequency in the frequency range. K, M, and Z are integers greater than or equal to 1, and z ranges from 1 to Z.

In a design, the processing unit 901 is further configured to convert the first signal into a digital signal, a frequency of the digital signal is within a second range, and the second range is $[k_0, k_0+K-1]$. $k_0$ is a subcarrier index corresponding to a subcarrier with a lowest frequency in the K subcarriers, and $k_0$ is an integer.

In a design, when the processing unit 901 is configured to separately perform the linear frequency modulation on the data signal in M continuous time segments within the frequency domain resources corresponding to the K subcarriers, the processing unit 901 is specifically configured to: perform phase shifting on the data signal; perform GIDFT on a data signal obtained through phase shifting; perform time-domain phase shifting on a data signal obtained through GIDFT; and increase, by a frequency adjustment amount, a frequency occupied by a data signal obtained through time-domain phase shifting, where the frequency adjustment amount is an integer multiple of a subcarrier width.

For example, when the apparatus 900 is used in the receive end, operations performed by the units of the apparatus 900 are described in detail.

The transceiver unit 902 is configured to obtain a first signal on K subcarriers. A frequency occupied by the first signal is within a frequency range of frequency domain resources corresponding to the K subcarriers. K is an integer greater than or equal to 1. The processing unit 901 is configured to demodulate the first signal by using the frequency range of the frequency resources corresponding to the K subcarriers as a sampling rate, to obtain a data signal.

Figure 10:
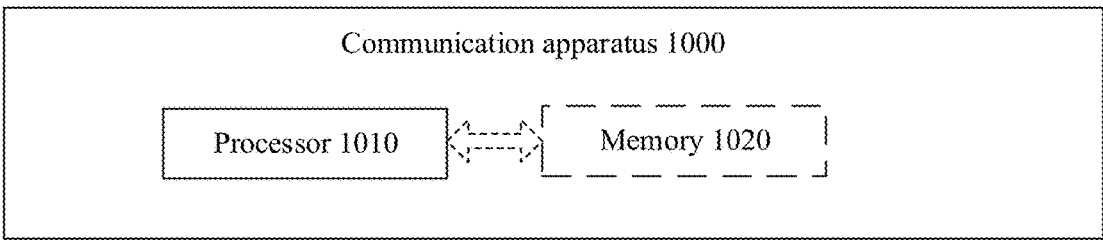
FIG. 10 is a block diagram of a communication apparatus according to an embodiment of this application.

Based on a concept of an embodiment, as shown in FIG. 10, an embodiment of this application provides a communication apparatus 1000. The communication apparatus 1000 includes a processor 1010. Optionally, the communication apparatus 1000 may further include a memory 1020, configured to: store instructions executed by the processor 1010, store input data required by the processor 1010 to run the instructions, or store data generated after the processor 1010 runs the instructions. The processor 1010 may implement the method shown in the foregoing method embodiment by using the instructions stored in the memory 1020.

Figure 11:
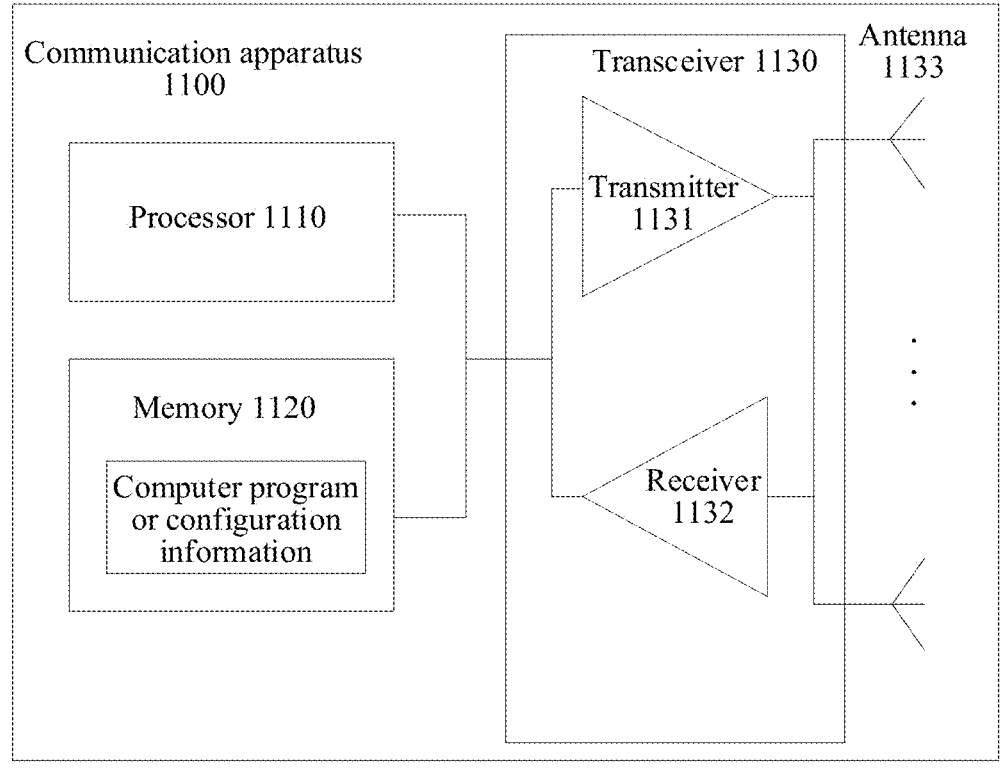
FIG. 11 is a diagram of a communication apparatus according to an embodiment of this application.

Based on a concept of an embodiment, as shown in FIG. 11, an embodiment of this application provides a communication apparatus 1100. The communication apparatus 1100 may be a chip or a chip system. Optionally, in this embodiment of this application, the chip system may include a chip, or may include a chip and another discrete device.

The communication apparatus 1100 may include at least one processor 1110. The processor 1110 is coupled to a memory. Optionally, the memory may be located inside the apparatus, or may be located outside the apparatus. For example, the communication apparatus 1100 may further include at least one memory 1120. The memory 1120 stores a computer program, configuration information, a computer program or instructions, and/or data necessary for implementing any one of the foregoing embodiments. The processor 1110 may execute the computer program stored in the memory 1120, to complete the method in any one of the foregoing embodiments.

The coupling in this embodiment of this application may be indirect coupling or a communication connection between apparatuses, units, or modules in an electrical form, a mechanical form, or another form, and is used for information exchange between the apparatuses, the units, or the modules. The processor 1110 and the memory 1120 may operate cooperatively. A specific connection medium between the transceiver 1130, the processor 1110, and the memory 1120 is not limited in this embodiment of this application.

The communication apparatus 1100 may further include a transceiver 1130, and the communication apparatus 1100 may exchange information with another device by using the transceiver 1130. The transceiver 1130 may be a circuit, a bus, a transceiver, or any other apparatus that can be configured to exchange information, or is referred to as a signal transceiver unit. As shown in FIG. 11, the transceiver 1130 includes a transmitter 1131, a receiver 1132, and an antenna 1133. In addition, when the communication apparatus 1100 is a chip-type apparatus or a circuit, the transceiver in the communication apparatus 1100 may alternatively be an input/output circuit and/or a communication interface, and may input data (or referred to as "receive data") and output data (or referred to as "send data"). The processor is an integrated processor, a microprocessor, or an integrated circuit, and the processor may determine outputted data based on inputted data.

In a possible implementation, the communication apparatus 1100 may be used in a transmit end. Specifically, the communication apparatus 1100 may be a device at the transmit end, or may be an apparatus that can support the device at the transmit end in implementing a function of the transmit end in any one of the foregoing embodiments. The memory 1120 stores a computer program, a computer program or instructions, and/or data necessary for implementing the function of the transmit end in any one of the foregoing embodiments. The processor 1110 may execute the computer program stored in the memory 1120, to complete the method performed by the transmit end in any one of the foregoing embodiments. Used in the transmit end, the transmitter 1131 in the communication apparatus 1100 may be configured to transmit a first signal through the antenna 1133.

In another possible implementation, the communication apparatus 1100 may be used in a receive end. Specifically, the communication apparatus 1100 may be a device at the receive end, or may be an apparatus that can support the device at the receive end in implementing a function of the receive end in any one of the foregoing embodiments. The memory 1120 stores a computer program, a computer program or instructions, and/or data necessary for implementing the function of the receive end in any one of the foregoing embodiments. The processor 1110 may execute the computer program stored in the memory 1120, to complete the method performed by the receive end in any one of the foregoing embodiments. Used in the receive end, the receiver 1132 in the communication apparatus 1100 may be configured to receive a first signal through the antenna 1133.

The communication apparatus 1100 provided in this embodiment may be used in the transmit end to complete the foregoing method performed by the transmit end, or may be used in the receive end to complete the method performed by the receive end. Therefore, for technical effects that can be achieved by the communication apparatus, refer to the foregoing method embodiments. Details are not described herein again.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, any conventional processor, or the like. The steps of the method disclosed with reference to embodiments of this application may be directly performed and completed by using a hardware processor, or may be performed and completed by using a combination of hardware and software modules in the processor.

In this embodiment of this application, the memory may be a non-volatile memory, for example, a hard disk drive (hard disk drive, HDD) or a solid-state drive (solid-state drive, SSD), or may be a volatile memory (volatile memory), for example, a random access memory (random access memory, RAM). Alternatively, the memory may be any other medium that can be configured to carry or store expected program code in a form of an instruction or a data structure and that can be accessed by a computer, but is not limited thereto. The memory in this embodiment of this application may alternatively be a circuit or any other apparatus that can implement a storage function, and is configured to store a computer program, a computer program or instructions, and/or data.

Based on the foregoing embodiments, refer to FIG. 12. An embodiment of this application further provides another communication apparatus 1200, including: an input/output interface 1210 and a logic circuit 1220. The input/output interface 1210 is configured to: receive a code instruction and transmit the code instruction to the logic circuit 1220. The logic circuit 1220 is configured to run the code instruction to perform the method performed by the transmit end or the receive end in any one of the foregoing embodiments.

The following describes in detail operations performed by the communication apparatus used in the transmit end or the receive end.

In an optional implementation, the communication apparatus 1200 may be used in the transmit end, to perform the method performed by the transmit end, specifically, for example, the method performed by the transmit end in the foregoing embodiment shown in FIG. 3. The logic circuit 1220 is configured to perform linear frequency modulation on Z data signals within frequency domain resources corresponding to K subcarriers, to obtain a first signal. The input/output interface 1210 is configured to output the first signal.

In another optional implementation, the communication apparatus 1200 may be used in the receive end, to perform the method performed by the receive end, specifically, for example, the method performed by the receive end in the foregoing method embodiment shown in FIG. 3. The input/output interface 1210 is configured to input a first signal on K subcarriers. The logic circuit 1220 is configured to demodulate the first signal by using a frequency range of frequency resources corresponding to the K subcarriers as a sampling rate, to obtain a data signal.

The communication apparatus 1200 provided in this embodiment may be used in the transmit end to perform the foregoing method performed by the transmit end, or may be used in the receive end to complete the method performed by the receive end. Therefore, for technical effects that can be achieved by the communication apparatus, refer to the foregoing method embodiments. Details are not described herein again.

Based on the foregoing embodiments, an embodiment of this application further provides a communication system. The system includes at least one communication apparatus used in a transmit end and at least one communication apparatus used in a receive end. For technical effects that can be achieved, refer to the foregoing method embodiments. Details are not described herein again.

Based on the foregoing embodiments, an embodiment of this application further provides a computer-readable storage medium. The computer-readable storage medium stores a computer program or instructions. When the instructions are executed, the method performed by the terminal device or the method performed by the network device in any one of the foregoing embodiments is implemented. The computer-readable storage medium may include any medium that can store program code, such as a USB flash drive, a removable hard disk, a read-only memory, a random access memory, a magnetic disk, or an optical disc.

To implement functions of the communication apparatuses in FIG. 9 to FIG. 12, an embodiment of this application further provides a chip, including a processor, configured to support the communication apparatus in implementing a function of the transmit end or the receive end in the foregoing method embodiments. In a possible design, the chip is connected to a memory, or the chip includes a memory. The memory is configured to store a computer program or instructions and data that are necessary for the communication apparatus.

A person skilled in the art should understand that embodiments of this application may be provided as a method, a system, or a computer program product. Therefore, this application may use a form of hardware-only embodiments, software-only embodiments, or embodiments combining software and hardware. In addition, this application may use a form of a computer program product that is implemented on one or more computer-usable storage media (including but not limited to a magnetic disk storage, a CD-ROM, an optical memory, and the like) that include computer-usable program code.

This application is described with reference to the flowcharts and/or the block diagrams of the method, the device (system), and the computer program product according to embodiments of this application. It should be understood that a computer program or instructions may be used to implement each procedure and/or each block in the flowcharts and/or the block diagrams and a combination of a procedure and/or a block in the flowcharts and/or the block diagrams. The computer program or the instructions may be provided for a general-purpose computer, a dedicated computer, an embedded processor, or a processor of another programmable data processing device to generate a machine, so that the instructions executed by the computer or the processor of another programmable data processing device generate an apparatus for implementing a specific function in one or more procedures in the flowcharts and/or in one or more blocks in the block diagrams.

The computer program or the instructions may alternatively be stored in a computer-readable memory that can instruct the computer or the another programmable data processing device to work in a specific manner, so that the instructions stored in the computer-readable memory generate an artifact that includes an instruction apparatus. The instruction apparatus implements a specified function in one or more procedures in the flowcharts and/or in one or more blocks in the block diagrams.

The computer program or the instructions may alternatively be loaded onto the computer or the another programmable data processing device, so that a series of operation steps are performed on the computer or the another programmable device to generate computer-implemented processing. Therefore, the instructions executed on the computer or the another programmable device provide steps for implementing a specific function in one or more procedures in the flowcharts and/or in one or more blocks in the block diagrams.

Apparently, a person skilled in the art may make various modifications and variations to embodiments of this application without departing from the scope of embodiments of this application. In this case, if the modifications and variations made to embodiments of this application fall within the scope of the claims of this application and their equivalent technologies, this application is intended to include these modifications and variations.

The invention claimed is:

1. A method for transmitting signals, comprising:

performing, by a transmit end, linear frequency modulation on Z data signals within frequency domain resources corresponding to K subcarriers to obtain a first signal, wherein the first signal comprises a cyclic prefix signal, the cyclic prefix signal is a signal generated based on the Z data signals and cyclic prefix time, a frequency occupied by the first signal is within a frequency range of the frequency domain resources corresponding to the K subcarriers, and a frequency occupied by each of Z data signals obtained through linear frequency modulation changes linearly with time, and wherein:

a $z^{th}$ data signal in the Z data signals corresponds to $M_z$ time segments, and slopes of linear changes of the $M_z$ time segments are the same;

when $M_z > 1$, a start frequency of an $M_z{}^{th}$ time segment is a lowest frequency in the frequency range, and an end frequency of an $(M_z-1)^{th}$ time segment is a highest frequency in the frequency range; or when $M_z > 1$, a start frequency of an $M_z{}^{th}$ time segment is a highest frequency in the frequency range, and an end frequency of an $(M_z-1)^{th}$ segment is a lowest frequency in the frequency range; and each of K, $M_z$, and Z is an integer greater than or equal to 1, and $z$ ranges from 1 to Z.

2. The method according to claim 1, wherein the first signal is an analog signal, the frequency of the first signal is within a first range, and the first range is $$\left[\left(k_0 - \frac{1}{2}\right)\Delta f, \left(k_0 - \frac{1}{2} + K\right)\Delta f\right],$$

or the first range is $$\left[\left(k_0 - \frac{1}{2} + K\right)\Delta f, \left(k_0 - \frac{1}{2}\right)\Delta f\right],$$

and wherein $k_0$ is a subcarrier index corresponding to a subcarrier with a lowest frequency in the K subcarriers, $k_0$ is an integer, and $\Delta f$ is a subcarrier width.

3. The method according to claim 1, wherein the first signal is a digital signal, the frequency of the first signal is within a second range, and the second range is $[k_0, k_0+K-1]$, or the second range is $[k_0+K-1, k_0]$, and wherein $k_0$ is a subcarrier index corresponding to a subcarrier with a lowest frequency in the K subcarriers, and $k_0$ is an integer.

4. The method according to claim 1, wherein the first signal further comprises a non-cyclic prefix signal, and the non-cyclic prefix signal is a signal generated based on the Z data signals and non-cyclic prefix time.

5. The method according to claim 1, wherein the performing, by a transmit end, linear frequency modulation on Z data signals within frequency domain resources corresponding to K subcarriers comprises:

performing, by the transmit end, phase shifting on the Z data signals;

performing, by the transmit end, K-point general inverse discrete Fourier transform (GIDFT) on data signals obtained through phase shifting to generate a second signal;

performing, by the transmit end, phase shifting on the second signal based on non-cyclic prefix time $\{n_1, \ldots, n_1+K-1\}$ to generate a third signal;

transforming, by the transmit end, the third signal to a frequency domain by performing K-point general discrete Fourier transform (GDFT);

mapping, by the transmit end, the third signal onto the K subcarriers to obtain a fourth signal;

transforming, by the transmit end, the fourth signal back to a time domain by performing N-point GIDFT to obtain a non-cyclic prefix signal with N points;

performing, by the transmit end, phase shifting on the second signal based on cyclic prefix $\{n_2, \ldots, n_2+K-1\}$ to generate a fifth signal;

transforming, by the transmit end, the fifth signal to the frequency domain by performing K-point GDFT;

mapping, by the transmit end, the fifth signal onto the K subcarriers to obtain a sixth signal; and transforming, by the transmit end, the sixth signal back to the time domain by performing N-point GIDFT to obtain a cyclic prefix signal with L points, wherein time corresponding to the L points is $\{ñ2, \ldots, ñ2+L-1\}$, and wherein L is a length of a cyclic prefix, N is a length of a non-cyclic prefix, and each of L and N is an integer greater than or equal to 0.

6. The method according to claim 4, wherein the cyclic prefix signal and the non-cyclic prefix signal are continuous in time.

7. The method according to claim 6, wherein ñ$_2$ satisfies the following formula:

$$\frac{(n_1 - n_2)N}{K} - L.$$

8. A method for transmitting signals, comprising:

obtaining, by a receive end, a first signal on K subcarriers, wherein the first signal comprises a cyclic prefix signal, the cyclic prefix signal is a signal generated based on Z data signals and cyclic prefix time, a frequency occupied by the first signal is within a frequency range of frequency domain resources corresponding to the K subcarriers, and each of K and Z is an integer greater than or equal to 1; and demodulating, by the receive end, the first signal by using the frequency range of the frequency domain resources corresponding to the K subcarriers as a sampling rate to obtain a data signal.

9. The method according to claim 8, wherein the first signal is an analog signal, the frequency of the first signal is within a first range, and the first range is $$\left[\left(k_0 - \frac{1}{2}\right)\Delta f, \left(k_0 - \frac{1}{2} + K\right)\Delta f\right],$$

or the first range is $$\left[\left(k_0 - \frac{1}{2} + K\right)\Delta f, \left(k_0 - \frac{1}{2}\right)\Delta f\right],$$

and wherein $k_0$ is a subcarrier index corresponding to a subcarrier with a lowest frequency in the K subcarriers, and $\Delta f$ is a subcarrier width.

10. The method according to claim 8, wherein the first signal is a digital signal, the frequency of the first signal is within a second range, and the second range is $[k_0, k_0+K-1]$, or the second range is $[k_0+K-1, k_0]$, and wherein $k_0$ is a subcarrier index corresponding to a subcarrier with a lowest frequency in the K subcarriers.

11. A communication apparatus, comprising: at least one processor, and one or more memories coupled to the at least one processor and storing programming instructions for execution by the at least one processor to:

perform linear frequency modulation on Z data signals within frequency domain resources corresponding to K subcarriers, to obtain a first signal, wherein the first signal comprises a cyclic prefix signal, the cyclic prefix signal is a signal generated based on the Z data signals and cyclic prefix time, a frequency occupied by the first signal is within a frequency range of the frequency domain resources corresponding to the K subcarriers, and a frequency occupied by each of Z data signals obtained through linear frequency modulation changes linearly with time, and wherein:

a $z^{th}$ data signal in the Z data signals corresponds to $M_z$ time segments, and slopes of linear changes of the $M_z$ time segments are the same;

when $M_z > 1$, a start frequency of an $M_z^{th}$ time segment is a lowest frequency in the frequency range, and an end frequency of an $(M_z-1)^{th}$ time segment is a highest frequency in the frequency range; or when $M_z > 1$, a start frequency of an $M_z^{th}$ time segment is a highest frequency in the frequency range, and an end frequency of an $(M_z-1)^{th}$ segment is a lowest frequency in the frequency range; and each of K, $M_z$, and Z is an integer greater than or equal to 1, and z ranges from 1 to Z.

12. The communication apparatus according to claim 11, wherein the first signal is an analog signal, the frequency of the first signal is within a first range, and the first range is $$\left[\left(k_0 - \frac{1}{2}\right)\Delta f, \left(k_0 - \frac{1}{2} + K\right)\Delta f\right],$$

or the first range is $$\left[\left(k_0 - \frac{1}{2} + K\right)\Delta f, \left(k_0 - \frac{1}{2}\right)\Delta f\right],$$

and wherein $k_0$ is a subcarrier index corresponding to a subcarrier with a lowest frequency in the K subcarriers, $k_0$ is an integer, and $\Delta f$ is a subcarrier width.

13. The communication apparatus according to claim 11, wherein the first signal is a digital signal, the frequency of the first signal is within a second range, and the second range is $[k_0, k_0+K-1]$, or the second range is $[k_0+K-1, k_0]$, and wherein $k_0$ is a subcarrier index corresponding to a subcarrier with a lowest frequency in the K subcarriers, and $k_0$ is an integer.

14. The communication apparatus according to claim 11, wherein the first signal further comprises a non-cyclic prefix signal, and the non-cyclic prefix signal is a signal generated based on the Z data signals and non-cyclic prefix time.

15. The communication apparatus according to claim 11, wherein the one or more memories store the programming instructions for execution by the at least one processor to:

perform phase shifting on the Z data signals;

perform K-point general inverse discrete Fourier transform (GIDFT) on data signals obtained through phase shifting to generate a second signal;

perform phase shifting on the second signal based on non-cyclic prefix time $\{n_1, \ldots, n_1+K-1\}$ to generate a third signal;

transform the third signal to a frequency domain by performing K-point general discrete Fourier transform (GDFT);

map the third signal onto the K subcarriers to obtain a fourth signal;

transform the fourth signal back to a time domain by performing N-point GIDFT to obtain a non-cyclic prefix signal with N points;

perform phase shifting on the second signal based on cyclic prefix time $\{n_2, \ldots, n_2+K-1\}$ to generate a fifth signal, transform the fifth signal to the frequency domain by performing K-point GDFT;

map the fifth signal onto the K subcarriers to obtain a sixth signal; and transform the sixth signal back to the time domain by performing N-point GIDFT to obtain a cyclic prefix signal with L points, wherein time corresponding to the L points is $\{\tilde{n}_2, \ldots, \tilde{n}_2+L-1\}$, and wherein L is a length of a cyclic prefix, N is a length of a non-cyclic prefix, and each of L and N is an integer greater than or equal to 0.

16. The communication apparatus according to claim 14, wherein the cyclic prefix signal and the non-cyclic prefix signal are continuous in time.

17. The communication apparatus according to claim 16, wherein $\tilde{n}_2$ satisfies the following formula:

$$\frac{(n_1-n_2)N}{K}-L.$$

18. A communication apparatus, comprising: at least one processor, and one or more memories coupled to the at least one processor and storing programming instructions for execution by the at least one processor to:

obtain a first signal on K subcarriers, wherein the first signal comprises a cyclic prefix signal, the cyclic prefix signal is a signal generated based on Z data signals and cyclic prefix time, a frequency occupied by the first signal is within a frequency range of frequency domain resources corresponding to the K subcarriers, and each of K and Z is an integer greater than or equal to 1; and demodulate the first signal by using the frequency range of the frequency domain resources corresponding to the K subcarriers as a sampling rate to obtain a data signal.

19. The communication apparatus according to claim 18, wherein the first signal is an analog signal, the frequency of the first signal is within a first range, and the first range is $$\left[\left(k_0-\frac{1}{2}\right)\Delta f, \left(k_0-\frac{1}{2}+K\right)\Delta f\right],$$

or the first range is $$\left[\left(k_0-\frac{1}{2}+K\right)\Delta f, \left(k_0-\frac{1}{2}\right)\Delta f\right],$$

and wherein $k_0$ is a subcarrier index corresponding to a subcarrier with a lowest frequency in the K subcarriers, and $\Delta f$ s a subcarrier width.

20. The communication apparatus according to claim 18, wherein the first signal is a digital signal, the frequency of the first signal is within a second range, and the second range is $[k_0, k_0+K-1]$, or the second range is $[k_0+K-1, k_0]$, and wherein $k_0$ is a subcarrier index corresponding to a subcarrier with a lowest frequency in the K subcarriers.

\* \* \* \* \*